US 6,401,073 B1

(12) United States Patent
Tokuda et al.

(10) Patent No.: US 6,401,073 B1
(45) Date of Patent: *Jun. 4, 2002

(54) METHOD AND SYSTEM FOR MANAGING WORKFLOW

(75) Inventors: Tamayo Tokuda, Ibaraki; Hisao Mase, Hirakata; Hiroshi Tsuji, Itami, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,755

(22) Filed: Mar. 13, 2000

Related U.S. Application Data

(63) Continuation of application No. 09/260,553, filed on Mar. 2, 1999, now Pat. No. 6,038,541, which is a continuation of application No. 08/618,791, filed on Mar. 20, 1996, now Pat. No. 5,878,398.

(30) Foreign Application Priority Data

Mar. 22, 1995 (JP) .............................. 7-088869

(51) Int. Cl.[7] .............................................. G06F 17/60
(52) U.S. Cl. ........................... 705/8; 709/206; 709/207; 709/238; 705/1
(58) Field of Search ..................... 705/1, 8, 9; 709/206, 709/207, 238

(56) References Cited

U.S. PATENT DOCUMENTS

| 5,283,856 A | | 2/1994 | Gross et al. ........... 395/200.36 |
| 5,315,504 A | * | 5/1994 | Lemble ........................ 700/90 |
| 5,377,354 A | | 12/1994 | Scannell et al. ............ 395/673 |
| 5,555,346 A | | 9/1996 | Gross et al. .................. 395/51 |
| 5,627,764 A | | 5/1997 | Schultzman et al. ... 395/200.37 |

(List continued on next page.)

FOREIGN PATENT DOCUMENTS

| JP | 06112971 A | * | 4/1994 |
| JP | 8263481 A | * | 10/1996 |

OTHER PUBLICATIONS

Walter "Documentum: open approach to automating workflow and management of long document"; Dec. 1993.*

"Application of Agent Mail System to Workflow Management," pp. 59–66, Akira Matsuo, et al. Of Research Report vol. 94, No. 60, Jul. 14 and 15, 1994.

"Automatic Sorting Documents Using Weighting IDF" of Research Report of the Information Processing Society of Japan, Takanobu Tokunaga, et al., 94–NL–100–5, pp. 33–39, May 17, 1994.

Society of Jappan, Takanobu Tokunaga, et al., 94–NL–100–5, pp. 33–39, May 17, 1994.

Primary Examiner—Kyle J. Choi
Assistant Examiner—Romain Jeanty
(74) Attorney, Agent, or Firm—Antonelli, Terry, Stout & Kraus, LLP

(57) ABSTRACT

A workflow managing system includes a workflow server for automatically extracting a next workflow entrance location from an electronic document for management of the next workflow entrance location. The workflow server analyzes the entered electronic document to extract a document type candidate from the electronic document, classifies the electronic document in accordance with the document type, refers to a table showing a relationship between the document types and in-charge departments or in-charge users associated therewith at the time of circulating the classified electronic document, automatically extracts next workflow entrance location candidate information for circulation of the sorted document type candidates, sends the sorted electronic document to the user terminal of the next workflow entrance location candidate, receives a signal indicative of acquisition or remand of the document circulated from the document-circulated user terminal, judges accuracy or inaccuracy of the next workflow entrance location candidate information, and confirms the accuracy or inaccuracy of the circulation.

9 Claims, 22 Drawing Sheets

U.S. PATENT DOCUMENTS

| | | | |
|---|---|---|---|
| 5,666,490 A | * 9/1997 | Gillings et al. | 709/238 |
| 5,751,960 A | 5/1998 | Matsunaga | 709/206 |
| 5,761,415 A | 6/1998 | Joseph et al. | 379/93.24 |
| 5,802,253 A | 9/1998 | Gross et al. | 709/206 |
| 5,845,116 A | * 12/1998 | Saito et al. | 709/103 |
| 5,878,230 A | 3/1999 | Weber et al. | 709/238 |
| 5,878,398 A | 3/1999 | Tokuda et al. | 705/8 |

* cited by examiner

FIG. 7A

ELECTRONIC DOCUMENT OBJECT 622 OF 'ORDER FORM 0704'

| WORKFLOW OBJECT LIST | {ORDER. TXT, ORDER. BMP} |
|---|---|
| ELECTRONIC DOCUMENT TYPE | ORDER FORM |
| POSSESSOR | USER C |

FIG. 7B

ELECTRONIC DOCUMENT OBJECT 621 OF 'OBSCURE NAME 0001'

| WORKFLOW OBJECT LIST | {TMP0001. TXT, TMP0001. BMP} |
|---|---|
| ELECTRONIC DOCUMENT TYPE | OBSCURE |
| POSSESSOR | USER C |

FIG. 8

USER OBJECT 613 OF 'USER C'

| USER | USER C |
|---|---|
| POSSESSED ELECTRONIC DOCUMENT OBJECT LIST | {ORDER FORM 0704, OBSCURE NAME 0001} |

FIG. 9

FORWARDING REQUESTS STACK OBJECT 641

| REQUEST NUMBER | WAITING ELECTRONIC DOCUMENT OBJECT |
|---|---|
| 1 | MULTIMEDIA-ASSOCIATED 1183 |
| 2 | OBSCURE NAME 0003 |
| 3 | NONE |

FIG. 10

BUSINESS DEFINITION TABLE 650

| DOCUMENT TYPE | POST IN-CHARGE |
|---|---|
| MULTIMEDIA-ASSOCIATED | FIRST UNIT |
| NETWORK-ASSOCIATED | SECOND UNIT |
| IMAGE-PROCESSING-ASSOCIATED | THIRD UNIT |
| DATABASE-ASSOCIATED | FOURTH UNIT |
| NATURAL LANGUAGE-ASSOCIATED | FIFTH UNIT |
| ORDER FORM | GENERAL AFFAIRS DEPARTMENT |
| ORDER DECISION FORM | ACCOUNTANTS' DEPARTMENT |
| OBSCURE | USER Z |

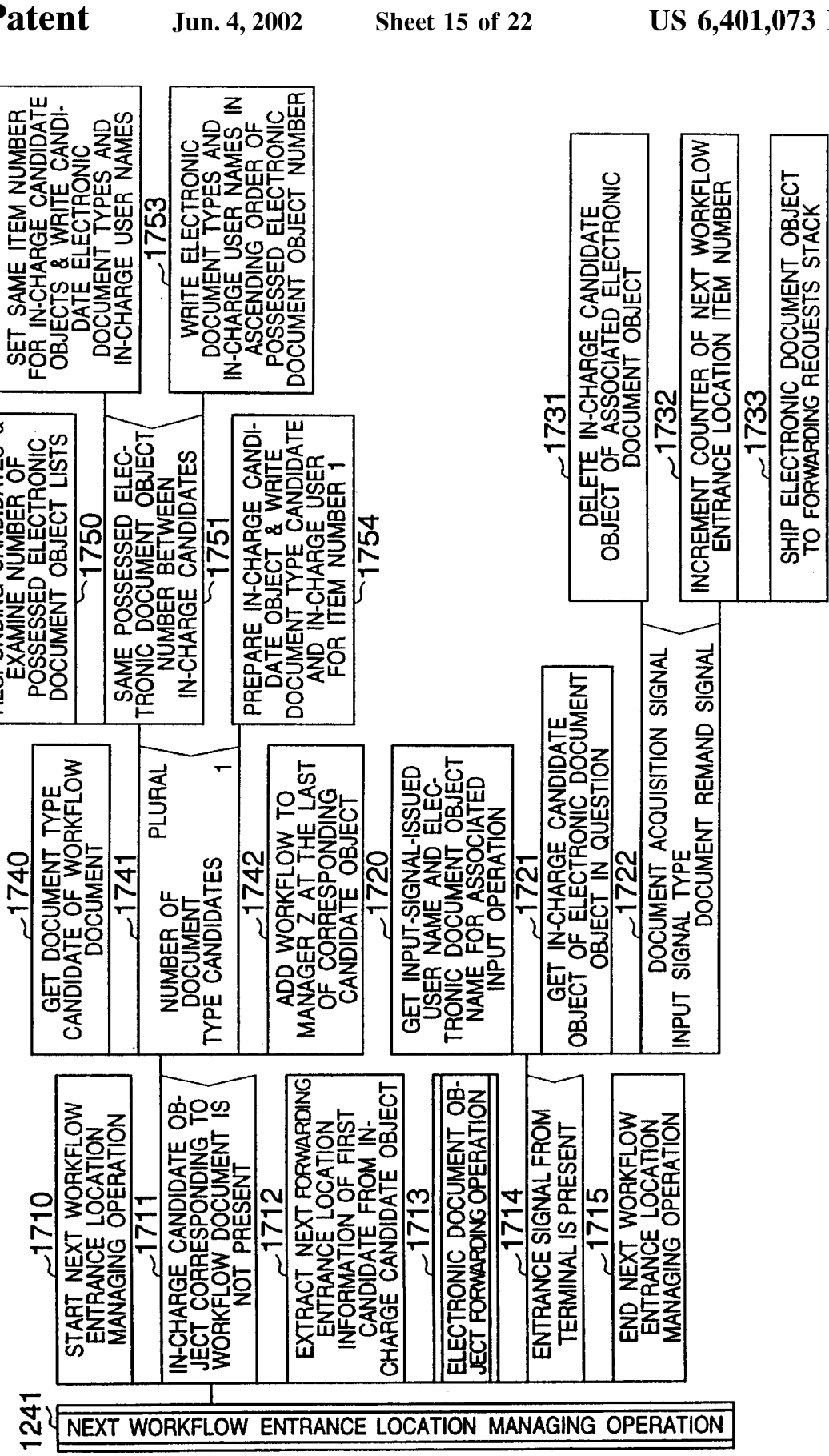

FIG. 18A

IN-CHARGE CANDIDATE OBJECT OF 'OBSCURE NAME 0001'

| ITEM NUMBER | CANDIDATE DOCUMENT TYPE | IN-CHARGE USER |
|---|---|---|
| 1 | ORDER FORM | GENERAL AFFAIRS DEPARTMENT |
| 2 | OBSCURE | USER Z |

FIG. 18B

IN-CHARGE CANDIDATE OBJECT OF 'OBSCURE NAME 0002'

| ITEM NUMBER | CANDIDATE DOCUMENT TYPE | IN-CHARGE USER |
|---|---|---|
| 1 | OBSCURE | USER Z |

FIG. 18C

IN-CHARGE CANDIDATE OBJECT OF 'OBSCURE NAME 0004'

| ITEM NUMBER | CANDIDATE DOCUMENT TYPE | IN-CHARGE USER |
|---|---|---|
| 1 | DATABASE-ASSOCIATED | FOURTH UNIT |
| 2 | NATURAL LANGUAGE-ASSOCIATED | FIFTH UNIT |
| 3 | OBSCURE | USER Z |

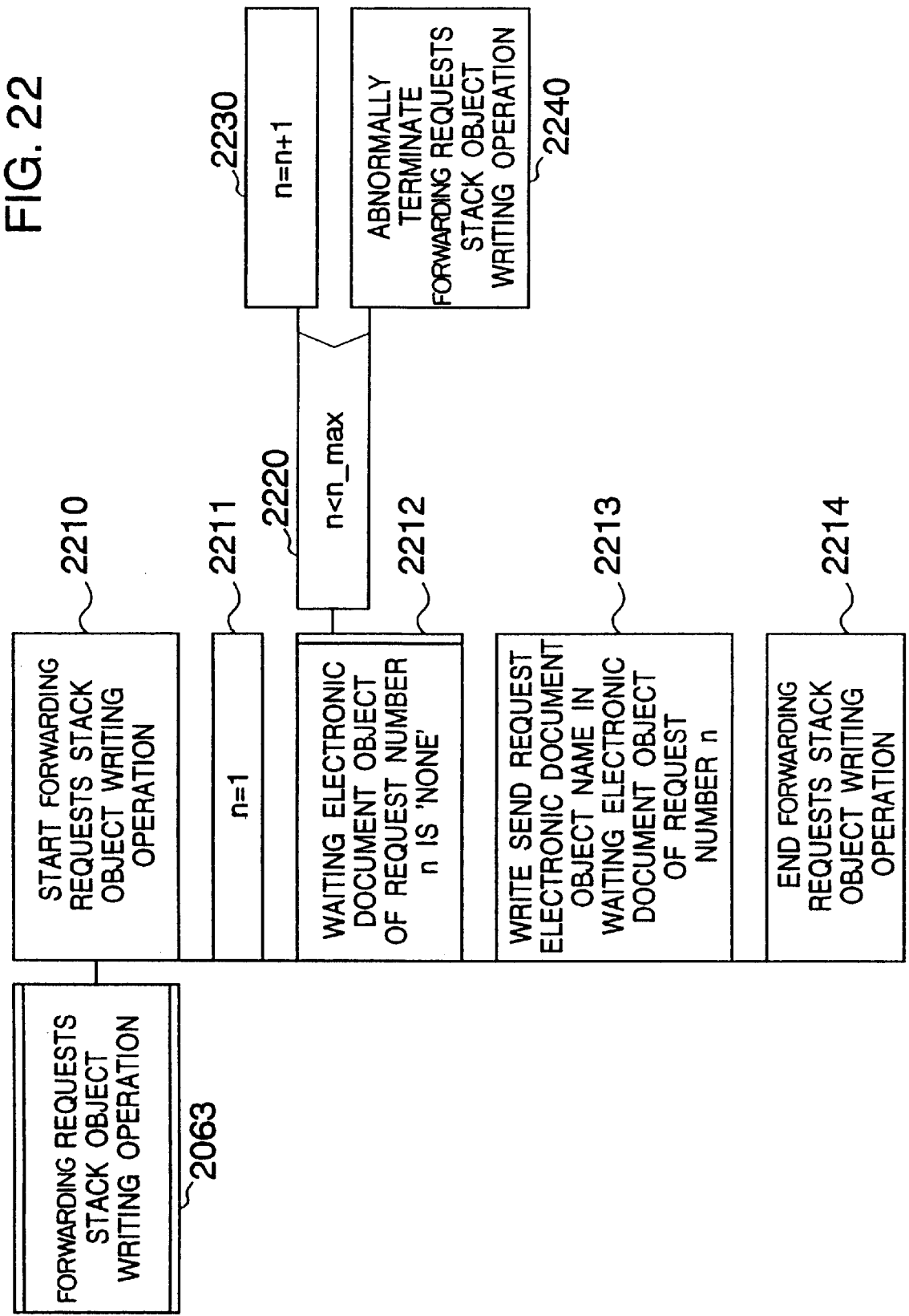

FIG. 23

USER A
 proc(
  case(SETTLEMENT DOCUMENT),
  in(BP_START),
  out(USER B)
 ),
 proc(
  case(ORDER FORM),
  in(BP_START),
  out(USER C)
 )

USER B
 proc(
  case(SETTLEMENT DOCUMENT),
  in(USER A),
  out(USER E)
 )

USER C
 proc(
  case(ORDER FORM),
  in(USER A),
  out(USER D)
 )

USER D
 proc(
  case(ORDER FORM),
  in(USER C),
  out(USER E)
 )

USER E
 proc(
  case(SETTLEMENT DOCUMENT),
  in(USER B),
  out(USER F)
 ),
 proc(
  case(ORDER FORM),
  in(USER D),
  out(USER F)
 )

USER F
 proc(
  case(SETTLEMENT DOCUMENT),
  in(USER E),
  out(BP_END)
 ),
 proc(
  case(ORDER FORM),
  in(USER E),
  out(BP_END)
 )

FIG. 24

```
#USER Z
 proc(
   case(UNNECESSARY DOCUMENT 001),
   in(BP_START),
   out(DUSTBOX)
 )
```

METHOD AND SYSTEM FOR MANAGING WORKFLOW

CROSS REFERENCE TO RELATED APPLICATIONS

This is a continuation of application Ser. No. 09/260,553, filed Mar. 2, 1999 now U.S. Pat. No. 6,038,541, which, in turn, is a continuation of Ser. No. 08/618,791, filed Mar. 20, 1996, now U.S. Pat. No. 5,878,398, issued Mar. 2, 1999, and the entire disclosures of which are incorporated herein by reference.

BACKGROUND OF THE INVENTION

The present invention relates to a technique for processing large quantities of documents to be circulated and, more particularly, to a method and system for effective management (including distribution) of workflow, for example, in companies, corporations, government offices, and other such organizations which employ centralized operations for accepting large amounts of documents and distributing them to persons in charge according to the contents thereof.

For the purpose of improving collaboration of the work to be performed in the actual distributing operations to improve office workers' productivity, such a system which supports the work procedure (or workflow) through involving the cooperation of a plurality of office workers has been increasingly demanded.

One such known workflow managing system, to those skilled in the art, is an electronic mail system. The electronic mail system refers to a means for exchanging or transferring messages between computers through a network. Numerous workflow systems for an electronic mail system have been previously made known.

In a system as that disclosed by Akira Matuo, et al., in a paper entitled "Application of Agent Mail System to Workflow Management", pp. 59–66, in the Research Report, Vol. 94, No. 60, Jul. 14 and 15, 1994 of the Information Processing Society of Japan, a workflow management system is implemented by using an agent mail system which performs automatic processing of electronic mail messages according to rules (agent scripts) described for user individuals.

In the aforementioned prior art, each user uses his or her own rule description language, called agent script, to describe messages and processings to be carried out therefor in the form of an agent script and to perform workflow management based on the contents of the agent script.

In the prior art workflow managing system, a user describes addressees of a document to be circulated in a description language such as a script. This system is advantageous in that the next workflow entrance location or workflow destination can be accurately described flexibly, and the system can be efficiently used for fixed formatted tasks because description contents can be modified and customized as necessary.

For such operations that a company organization accepts, at its one department, large quantities of documents generated outside the organization, however, the system is disadvantageous in that distributing of the documents to associated persons in charge requires a heavy burden to be imposed on the worker doing the distributing (distributing worker). The system user in charge of such distributing works must understand the contents of all the documents and, also, describe the next workflow entrance locations of the documents, one by one. In particular, when the document contents is specialized, it will inevitably take a lot of time for the document distributing user to understand the contents of the documents. In addition, it takes lots of time to train such an operator that can rightly determine the next workflow entrance locations of the documents.

In this way, the greater the quantities of documents to be handled are, the greater is the burden imposed on such a user who is to determine the next workflow entrance locations of such large quantities of documents. For this reason, there has been demanded a means for lightening such user's burden.

SUMMARY OF THE INVENTION

It is, therefore, an object of the present invention to provide a workflow managing method which can automatically extract next workflow entrance locations from the contents of electronic documents to control or manage the next workflow entrance locations, and, also, to provide a system using the method.

Another object of the present invention is to provide a workflow managing method which performs its next workflow-entrance-location management according to workflow paths described by a user to thereby allow the forwarding of even such document to a suitable next workflow entrance location, which location cannot be automatically extracted to its right next workflow entrance location, and also to provide a system using the method.

In accordance with an aspect of the present invention, the above objects can be attained by providing a workflow managing system in which at least one workflow server and a plurality of user terminals are interconnected through a network to transfer electronic documents from the workflow server to the user terminals, the workflow server comprising document type sorting means for analyzing each of the entered electronic documents, extracting a candidate of document type therefrom and classifying the electronic document according to the document type; a table showing a relationship between the document types and in-charge departments or in-charge users associated therewith; next workflow entrance location candidate extracting means, when the electronic document classified by the document type sorting means is circulated, for collating the document type candidate from the sorting means with the table to automatically extract the next workflow entrance location candidate information of the electronic document therefrom; and correctness or incorrectness conforming means, in response to an output of the next workflow entrance location candidate extracting means, for receiving an input signal from a user terminal receiving the workflow of the electronic document on the basis of the extracted next workflow entrance location candidate information, judging whether the next workflow entrance location candidate information is correct or incorrect and confirming the correctness or incorrectness of the workflow to allow the specific user to specify the next workflow entrance location of the electronic document.

Further, the workflow server includes default means, when it is impossible for the document type sorting means to extract the document type candidate or when the correctness or incorrectness confirming means con-firmed the incorrectness of the next workflow entrance location candidate information, for automatically specifying the user terminal of a predetermined specific user as a next workflow entrance location of the electronic document.

Furthermore, the input signal for the document circulated from the user terminal includes a signal indicative of document acquisition operation meaning determination of the next in-charge workflow entrance location of the document and a signal indicative of document remand operation meaning that the next workflow entrance location is not the next in-charge workflow entrance location of the document, and the correctness or incorrectness confirming means judges the correctness or incorrectness of the next workflow entrance location candidate information by selecting the signals from the user terminal.

In addition, the workflow server includes means, when a plurality of document types are present for the electronic document extracted by the document type sorting means and a plurality of pieces of next workflow entrance location candidate information are outputted from the next workflow entrance location candidate extracting means, for assigning priorities to the next workflow entrance location candidates of the electronic document in accordance with the number of electronic documents possessed by the next workflow entrance location candidates to send the electronic document to the next workflow entrance location candidates in a higher priority order when the priorities are different and to broadcast the electronic document to the next workflow entrance location candidates when the priorities are the same.

Since the above means enables management of the next workflow entrance location by automatically extracting the next workflow entrance location from the contents of the entered electronic document, when a large amount of documents must be externally accepted and be circulated, the system of the present invention can lighten the burden of the user distributing the documents to their proper in-charge users.

Further, when the system is also provided with the next workflow entrance location managing function or default function based on workflow paths described by the user, the system can finely specify the next workflow entrance locations as necessary and can circulate the electronic documents with less intervention of manual labor and without any deterioration of the merits of the prior art.

In addition, since the labor that the user understands the contents of the documents and describes their next workflow entrance locations can be lessened, the corresponding saved time can be used to conduct other works, thus realizing improvement in work efficiency.

Other objects, features and advantages of the present invention will become apparent from the following embodiments taken in conjunction with the accompanying drawings.

BRIEF DESCRIPTION OF THE DRAWINGS

FIGS. 7A and 7B are examples of an electronic document object respectively;

FIG. 8 shows an example of a user object;

FIG. 9 shows an example of a forwarding requests stack object;

FIG. 10 shows an example of a business definition table;

FIG. 17 is a PAD diagram for explaining the operation of a next-workflow-entrance-location managing program;

FIGS. 18A to 18C show different examples of an in-charge candidate object respectively;

FIG. 22 is a PAD diagram for explaining the operation of a forwarding requests stack object writing operation;

FIG. 23 shows an example of business process definition wherein workflow paths are defined; and FIG. 24 shows an example of business process definition when an unnecessary document is processed.

DESCRIPTION OF THE PREFERRED EMBODIMENTS (1) Summary of Workflow Managing Business First of all, explanation will be briefly made as to workflow managing business to be carried out in an embodiment of the present invention.

In the present invention, documents flowing through workflow paths are assumed to include two types of documents, that is, the documents in which the type name of each document and the name of a next workflow user in charge of the same document are clearly specified therein, and the documents in which the type name of each document and the name of a next workflow user in charge of the same document are not clearly specified therein.

Figure 1:
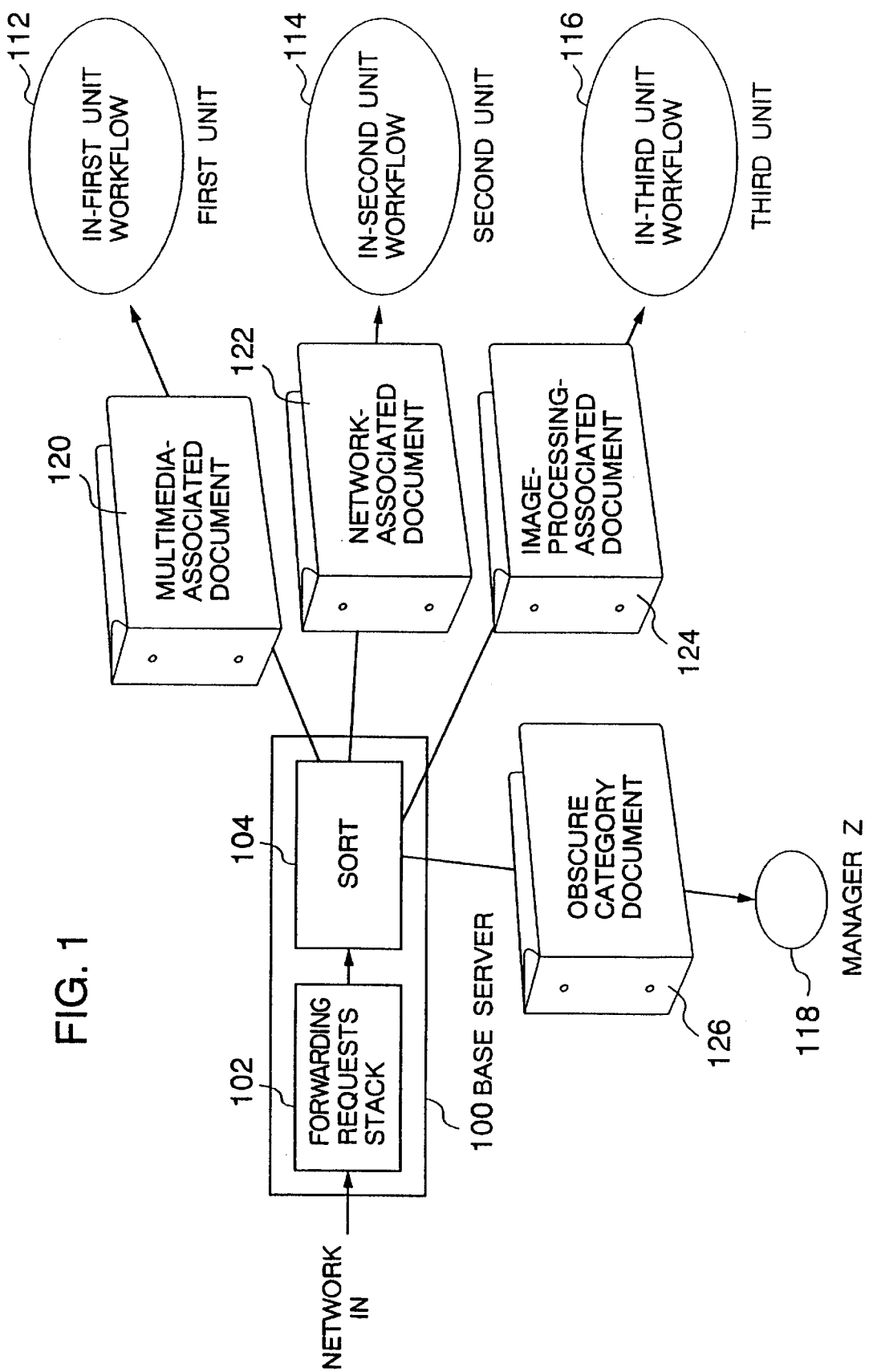
FIG. 1 is a diagram for explaining how electronic documents collected in a base server are circulated.

FIG. 1 shows an embodiment when such electronic documents that the type name of each document and the name of a next workflow user in charge of the same document are not clearly specified therein are externally accepted just now to be sorted for workflow management.

Figure 2:
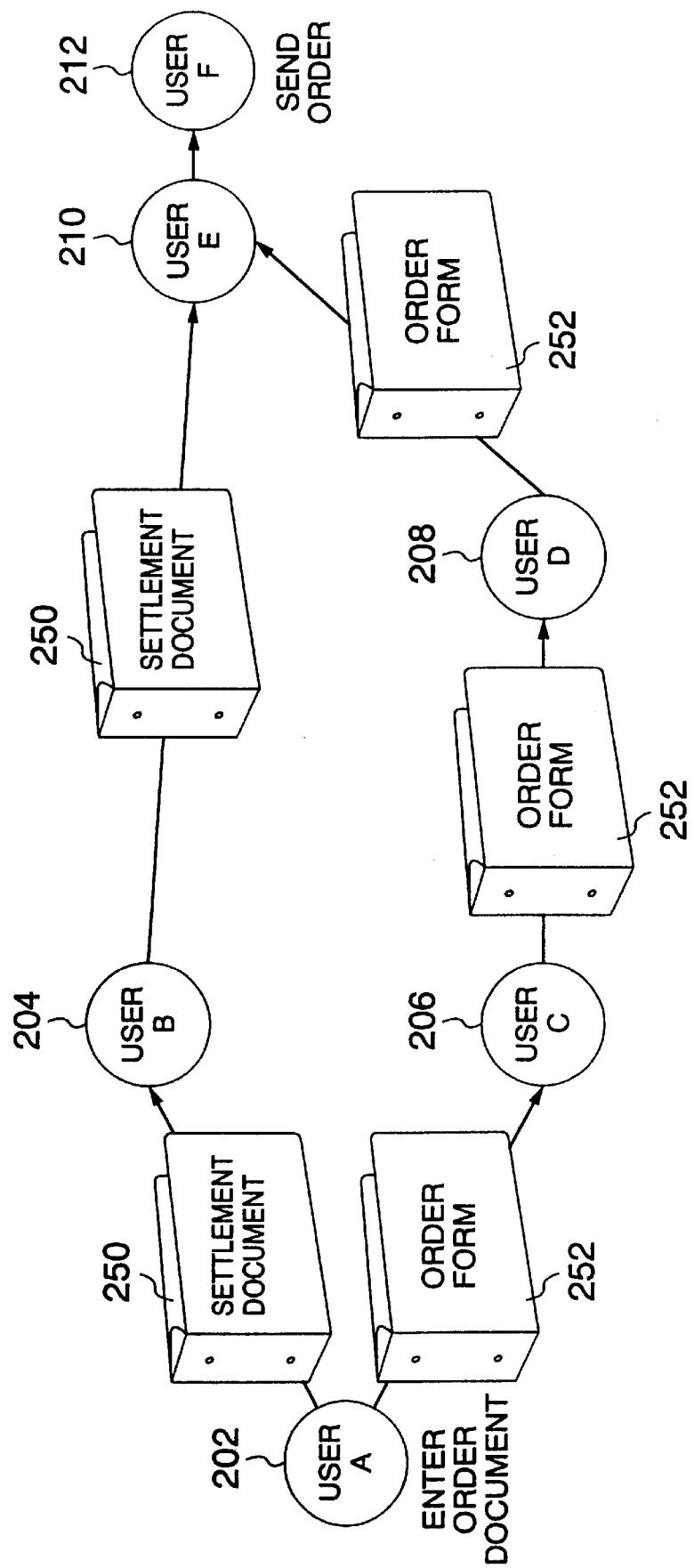
FIG. 2 is a diagram for explaining how electronic documents are circulated in the form of a workflow processing flow.

FIG. 2 is a representation of how to circulate electronic documents after a user receives from a workflow server in the form of a processing flow. More specifically, in this case, FIG. 2 shows an aspect of workflow in the case where document type names of the electronic documents and their next workflow user names have been already specified by a workflow dispatcher. The workflow server performs its forwarding operation in accordance with the definition of next workflow entrance location and sequence specified by the workflow dispatcher.

FIG. 1 corresponds to an upper-level workflow of a hierarchical system, while FIG. 2 corresponds to a lower-level workflow thereof.

Illustrated in FIG. 1 is the managing operation of the electronic documents collected in the base server to be carried out in the present embodiment.

In FIG. 1, reference numeral 100 denotes a base server of a workflow managing system, 102 a forwarding requests stack in which an electronic document within the base server 100 subjected to a forwarding request is once stored, 104 a sorter for performing its sorting or classifying operation over electronic documents which next shipping entrance locations are not clear. The sorter comprises, for example, a general document automatic sorting system for extracting keywords from a document, performing calculation with use of prestored keywords and weights to sorting categories and sorting it on the basis of its calculation result.

Numeral 112 denotes a first unit for performing multimedia-associated business, 114 a second unit for performing network-associated business, 116 a third unit for performing image-processing-associated business, 118 a workflow manager z having a means for defining the next workflow entrance location of the document which destination became unclear or obscure as a result of the sorting operation. The defining means will be given later in the form of its detailed example.

Arrows connecting the base server 100 and the first, second and third units 112, 114, 116 and workflow manager Z 118 represent workflow paths of electronic documents; while documents 120, 122, 124 and 126 on the arrows are electronic document objects 120, 122, 124 and 126 which were judged as the multimedia-, network-, image-processing-associated and obscure-entrance-location documents as a result of the sorting operation respectively. The electronic document objects 120, 122, 124 and 126 are sent to the first, second and third units 112, 114 and 116 and workflow manager Z 118 respectively.

Explanation will then be made as to flows of workflow managing operations.

When an electronic document is input into the forwarding requests stack 102 of the base server 100, a forwarding executing program forwards the input document to a person in charge of the document. More in detail, the electronic document input in the forwarding requests stack 102 is input to the base server 100 from a terminal unit connected to the server via a network.

The forwarding executing program reads on the electronic document stored in the shipping requests stack 102 therefrom, acquires an electronic document type from the electronic document object of the rea-out electronic document, and examines the acquired document type. When the forwarding executing program judges that the document type is obscure, this causes a starting program 104 to be started to determined the category of the document according to the sorting category.

For example, when electronic documents stored in the forwarding requests stack 102 are all accepted just now from the outside, the documents are not clear in their document types and thus subjected to the sorting operation.

When the sorting program judges the document 120 as the document of a multimedia category, the sorting program refers to a business definition table showing a relationship between document types and departments of businesses associated therewith, determines the first unit as its next workflow entrance location on the basis of the document type name "multimedia-associated" obtained through the sorting operation, and then ships the sorted document to the first unit.

For the next shipping destination, a user as the manager of the first unit may be specified, or when the first unit is a large department and has a server having a sorting function, the server may be specified.

A workflow managing method based on the sorting result will be detailed later.

In this connection, the document type obtained through the sorting operation is not determined already as a final decision but it is merely a high probable document type candidate until the forwarding executing program obtains a document acceptance signal from the user of the next workflow entrance location to which the document was forwarded. The forwarding executing program, only when accepting the document acceptance signal, determines the document type, which will be explained later. Thus, the document type will be represented by 'document type candidate' before the document type is finally determined.

With respect to the electronic document 122 judged by the sorting program as a 'network-associated' category document, the program refers to the business definition table with use of the document type candidate name 'network-associated' as a key, determines the second unit as its next workflow entrance location candidate, and then forwards the corresponding electronic document to the second unit.

With respect to the electronic document 124 sorted by the sorting program as an image-processing category document, the shipping executing program refers to the business definition table, determines the third unit as its next workflow entrance location on the basis of the document type candidate name 'image-processing-associated', and then ships the corresponding electronic document to the third unit. In this connection, the number of sorting categories is not limited to 3 but the category number may be increased as the company organization becomes large in scale.

With respect to the electronic document 126 decided as an 'obscure category document' through the sorting operation of the sorting program, the forwarding executing program sends the associated electronic document to the workflow manager Z 118. In order to send the workflow document to its right next workflow entrance location, the workflow manager Z 118 describes its workflow path using a business process definition to be explained later.

Shown in FIG. 2 in the form of flows is a workflow procedure of electronic documents within the first unit 112 in FIG. 1.

In FIG. 2, reference numerals 202, 204, 206, 208, 210 and 212 denote users A to F who uses the workflow managing system. Arrows directed between the users represent workflow paths. Folders illustrated on the arrows represent electronic documents to be circulated, which are denoted by numerals 250 and 252.

Explanation will next be made as to the workflow flows of FIG. 2 to be executed based on script. First, the user A 202 enters an electronic document to be circulated into the workflow managing system. In this conjunction, the document entered by the user A 202 may be a document circulated from the base server 100 or may be a document newly entered by the user A. The user A gives information on a clearly shown workflow path to the electronic document and issues a shipping request.

The settlement document 250 is circulated to the user E 210 through the user B 204. The order form 252 is circulated to the user E through the users C and D 206 and 208. In this case, the users B 204 to E 210 may overwrite the workflow document and sends it to the next workflow entrance location.

The user E accepts the settlement document 250 and order form 252, approves and sends them to the user F 212. The user F 212, when receiving the settlement document and order form, conducts its order processing works.

As an means for describing the workflow paths by a user in the workflow processing of FIG. 2, such a business process definition as shown in FIG. 23 is given. The business process definition, which defines the workflow processing of FIG. 2, is prepared, e.g., by the user A located at the start point of the workflow of FIG. 2 but may be selectively prepared by another manager. Further in this case, the business process definition is assumed to define the workflow from a start point to an end point, but as necessary, the definition may define the workflow from the start point to an intermediate point. This business process definition reflects on a business process definition object block of FIG. 6 to be explained later.

In FIG. 23, 'proc', which is used to define information in a workflow, includes elements 'case', 'in' and 'out'. Written or entered in the 'case' is the name of a document to be subjected to a workflow, in the 'in' is the name of a user as a previous workflow user, and in the 'out' is the name of a user as a next workflow entrance location. 'bp_start' meaning start of the workflow is entered in the 'in' while 'bp_end' is in the 'out', which specifies the start and end of the workflow. A user can freely describe a workflow path by combining such 'proc's so that a document can be circulated according to a business process definition described by the user.

Further, when 'dustbox' in place of 'bp_end' is specified in 'out' of 'proc' for the final workflow reader as shown in FIG. 24, a document, which became unnecessary after completion of the workflow or is judged as unnecessary by the manager Z, can be discarded. Both ordinary user and workflow manager uses the business process definition to specify a workflow path. The explanation in connection with FIG. 2 has now been completed.

FIG. 1 is a representation of an example of next workflow entrance location management based on the contents of documents through the sorting operation, while FIG. 2 is a representation of an example of workflow paths manually defined and document flows. Although the documents which require the next workflow entrance location management through the sorting operation have been separately illustrated from the documents which workflow paths are already defined within the base server 100 in FIGS. 1 and 2, such documents may be present as mixed.

Further, the workflow managing system can have a nest structure and in this case, FIG. 1 forms one unit of such a workflow managing system.

Since business task separation becomes ambiguous as the workflow proceeds to a lower-level part, it is general that the sorting operation is carried out in the workflow management of the upper-level workflow while the next workflow entrance location management is carried out based on a next workflow entrance location definition, i.e., a business process definition described by a user in the lower-level workflow. When tasks in charge of respective persons are highly clearly separated, however, the user can directly specify the individual user names in the business definition table even in the lower-level workflow of the system so that the respective tasks can be directly read by the individuals all through the sorting operation.

(2) Device Configuration of Workflow Managing System

Figure 3A:
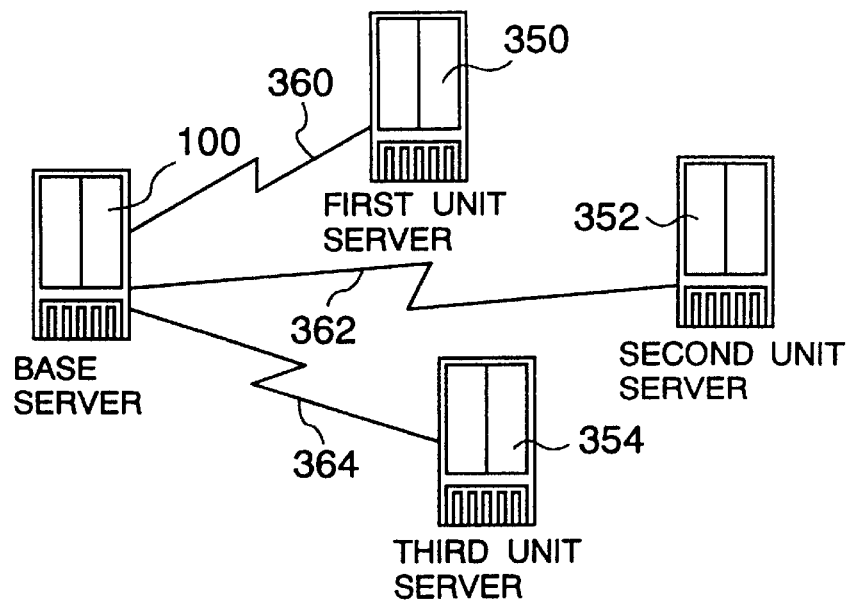
FIGS. 3A and 3B show an interconnection configuration of servers in workflow managing systems and a device configuration of one of the workflow managing systems, respectively.
Figure 3B:
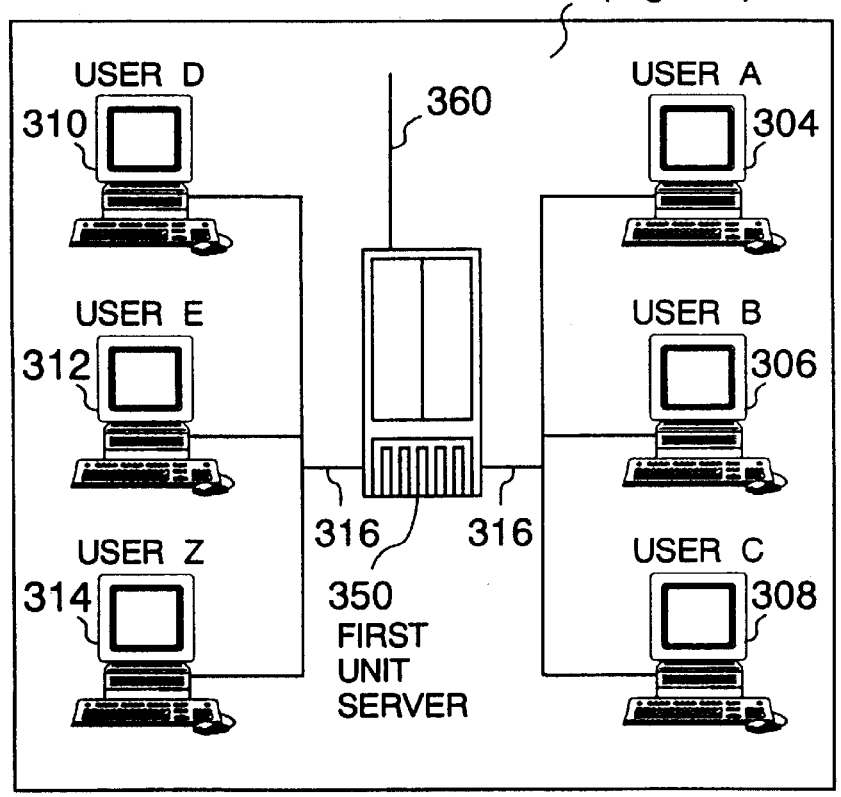

FIGS. 3A and 3B schematically show a configuration of a workflow managing system in accordance with an embodiment of the present invention. More specifically, FIG. 3A shows an interconnection between servers used in workflow managing systems hierarchically connected and FIG. 3B shows, in a model form, a device configuration of one of the workflow managing systems of FIG. 3A.

Explanation will first be made in connection with FIG. 3A.

The base server 100 of FIG. 1 having the first, second and third units 112, 114 and 116 for workflow management is connected to a first unit server 350, a second unit server 352 and a third unit server 354 which are servers of the first, second and third units 112, 114 and 116 of the workflow managing systems respectively. Interconnection between the base server 100 and servers 350, 352 and 354 is effected by means of respective networks 360, 362 and 364.

Explanation will next be made in connection with FIG. 3B. A workflow managing system 300 of the first unit 112 of FIG. 1 includes the first unit server 350 for management and workflow control of electronic documents, user terminals 304, 306, 308, 310, 312 and 314, and a network 316. The user terminals 304, 306, 308, 310, 312 and 314 are allocated to the users A to E and Z as the users of the present system respectively. However, the number of terminals is not limited to 6 but one of such users may use ones of such user terminals or one of the user terminals may shared between a plurality of users.

In the workflow of electronic documents of the present system, the users each use the user terminals 304, 306, 308, 310, 312 and 314 to acquire an electronic document, edit the document, and take actions to send the document to the next workflow entrance location or when the received document is not in charge of him or her, to send it back.

The server 350 extracts an electronic document from its shipping requests stack and judges whether the document has a next forwarding destination or entrance location specified therein or has an obscure document type and thus requires the sorting operation. When judging that the document has an obscure document type, the server causes the document type sorting means to carry out its sorting operation to get document type candidates through the document type sorting operation, manages its next workflow entrance location in accordance with the document type candidates, and then forwards the document to the next destination, thus completing the forwarding operation of the document.

When the document type is clear thus the sorting operation is unnecessary, the server forwards the document to the next workflow entrance location in accordance with the described workflow path, thus completing the forwarding operation of the document. The sorting operation will be explained later.

Figure 4:
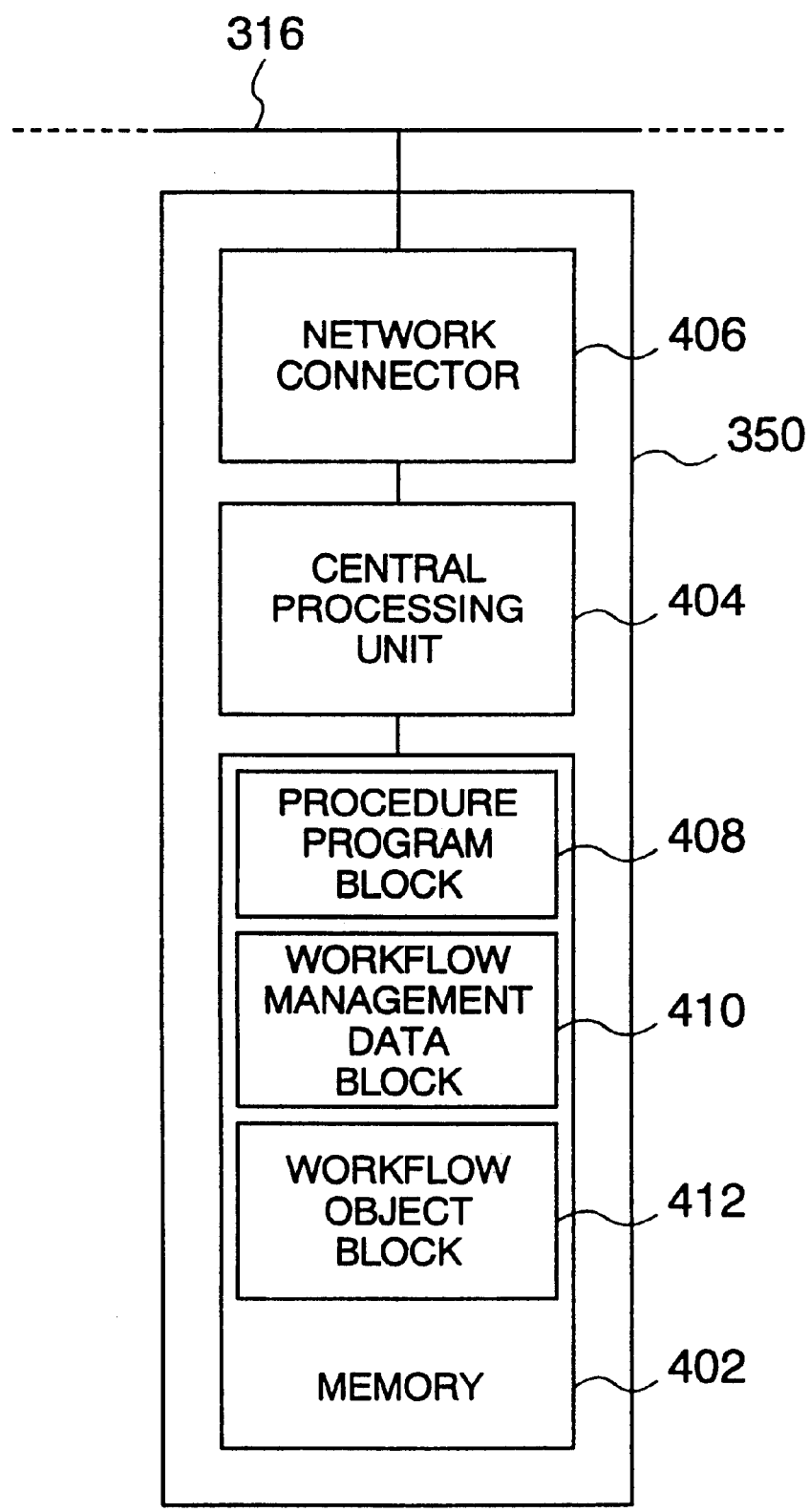
FIG. 4 is a block diagram of a server.

Shown in FIG. 4 is a structure of the server 350.

The server 350 includes a memory 402, a central processing unit 404 and a network connector 406. The memory 402 further has a procedure program block 408 in which a workflow procedure of electronic documents is described, a workflow management data block 410 of management data necessary for user management and workflow management, and a workflow object block 412 of electronic documents to be workflow managed.

The central processing unit 404 reads out the procedure program from the procedure program block 408 and executes the workflow managing operation. The network connector 406 connects the user terminals 304, 306, 308, 310, 312 and 314 and the server 350 through the network 316 for data transfer between the server 350 and the user terminals.

Figure 5:
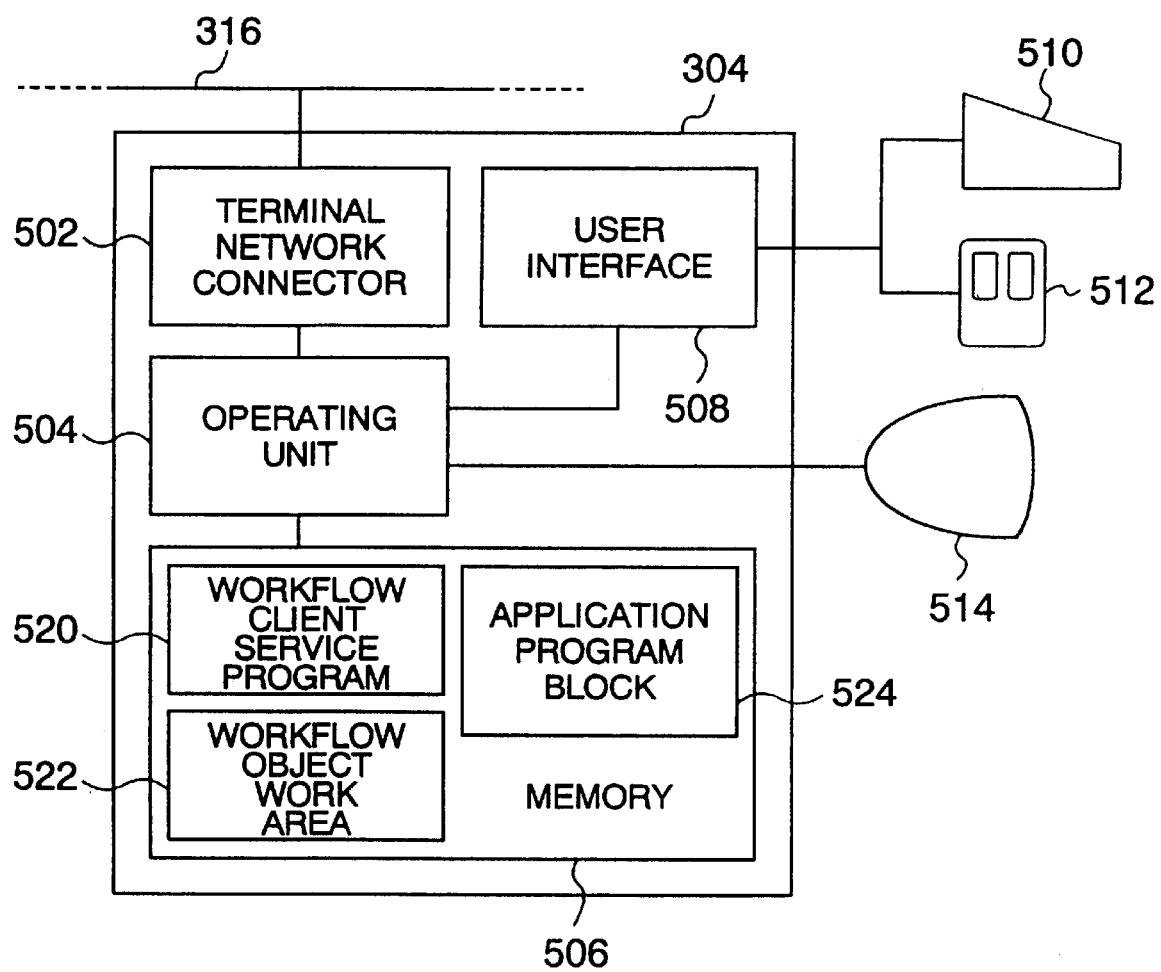
FIG. 5 is a block diagram of a user terminal.

FIG. 5 shows a structure of a general example of the user terminal 304.

A memory 506 stores therein a workflow client service program 520 in which described is a processing procedure of how an electronic document read at a terminal by the user is processed, a workflow object work space or area 522 for judgement of whether or not the workflow object of the workflow electronic document is in charge of his own or for copying of the electronic document sent from the server 350 for reference or editing, and an application program block 524 for judgement of whether or not the workflow electronic document object is in charge of his own or for reference or editing.

An operating unit 504 reads out the workflow client service program 520 from the memory 506 to execute its terminal processing. A terminal network connector 502 connects the user terminal 304 and the server 350 through the network 316 for data transfer between the server 350 and user terminal 304.

A user interface 508 detects a user input from a keyboard 510 or a mouse 512 and transmits it to the operating unit 504. A display unit 514 displays a processed result of the operating unit thereon.

(3) Explanation of Data Stored in Memory 402 of Server 350

Data stored in the memory 402 of the first unit server 350 will next be explained in detail in connection with FIGS. 4 and 6.

(3-1) Workflow Object Block

The workflow object block 412 in FIG. 4 has a plurality of workflow objects to be circulated by users. The workflow object refers to an electronic still or motion image, voice, text or a combination thereof.

(3-2) Workflow Management Data Block

Figure 6:
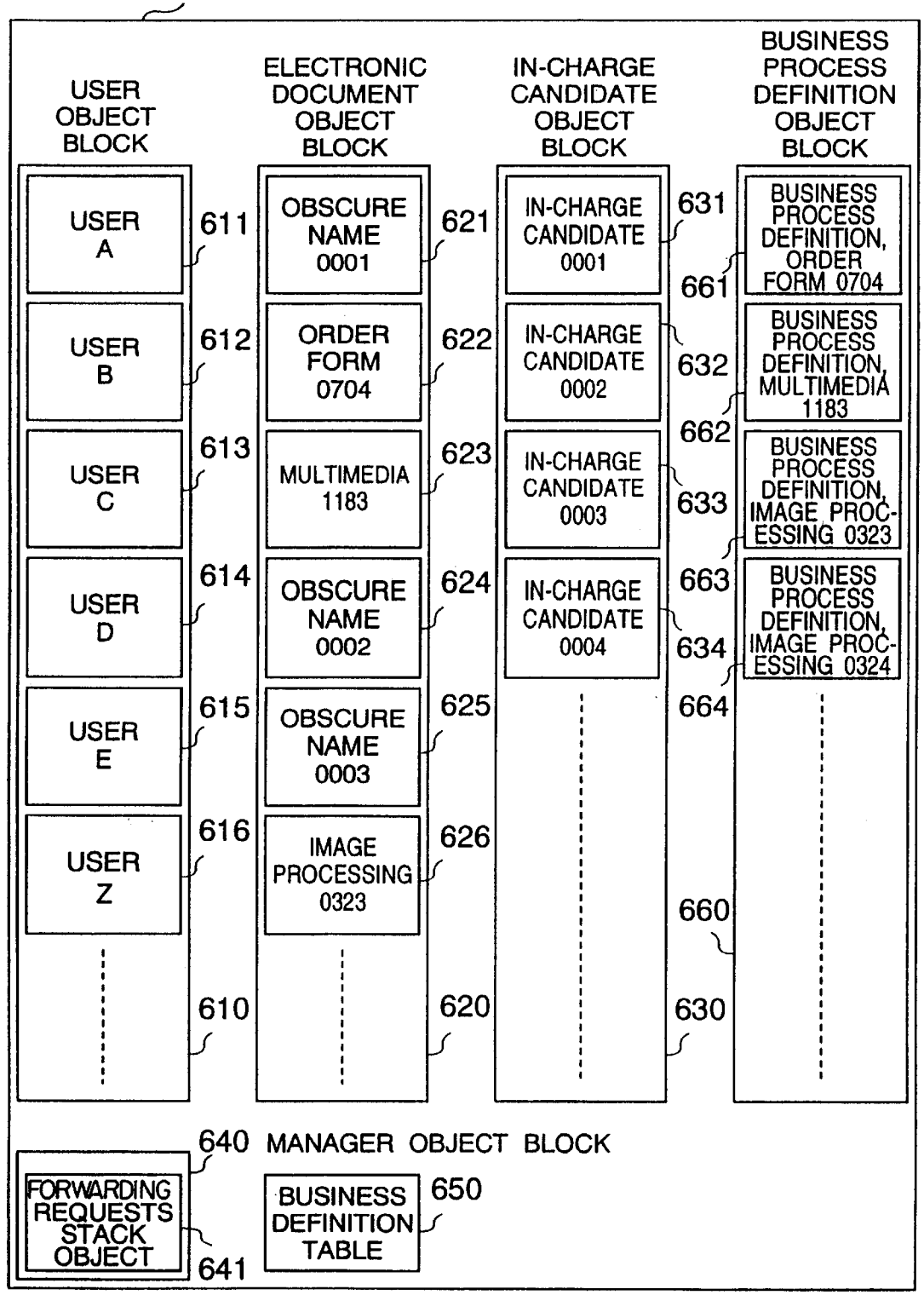
FIG. 6 shows an arrangement of a workflow management data block.

The workflow management data block 410 in FIG. 4 is made up of such object blocks as shown in FIG. 6.

A user object block 610 includes user objects indicative of user information set by respective users, that is, the user objects of 'user A 611' to 'user E 615' and 'user Z616' are for the user A to E and the user Z.

An electronic document object block 620 includes electronic document objects indicative of management information for reading a single or a plurality of workflow objects in the form of a single electronic document.

An in-charge candidate object block 630 includes document in-charge candidate lists of document processing prepared for the respective electronic document objects based on the sorted result after the electronic documents having obscure document types are subjected to the document type sorting operation. For the electronic document object having a document type already specified and having a next forwarding destination already defined therein, the sorting operation is unnecessary and thus its next workflow entrance location candidate list is not prepared. Accordingly, its in-charge candidate object is also not present.

A business process definition object block 660 includes business process definitions 661 to 664 for determining the next workflow entrance locations of the documents having a document type clearly known and to be workflow-managed on the basis of the workflow paths defined by the users. Present in the electronic document to be workflow managed is either one of the in-charge candidate object or business process definition.

A manager object block 640 includes a forwarding requests stack object 641 as a data object of managing the entire workflow managing system, which forwarding requests stack object is a first-in first-out stack for storing therein the name of an electronic document object required by the terminal user to be sent to the next workflow entrance location.

A business definition table 650 describes a relationship between the document types and business destinations in charge thereof, and when the in-charge candidate object is prepared after the sorting operation of the document type to be explained later, the table is referred to.

FIG. 7A shows the electronic document object 'order form 0704' 622 as an example of the electronic document object, while FIG.7B shows the electronic document object 'obscure name 0001' 621.

An item 'workflow object list' represents a list of names of electronic document objects which are circulated. The object 'order form 0704' 622 is made up of 'order.txt' and 'order.bmp' in FIG. 7A, while the object 'obscure name 0001' 621 is made of 'tmp0001.txt' and 'tmp0001.bmp' in FIG. 7B.

Item 'electronic document type' represents the type of an the electronic document object.

The electronic document object 'order form 0704' 622 has an electronic document type 'order form', while electronic document object 'obscure name 0001' has an electronic document type 'obscure'. In FIG. 7B, the object 'obscure name 0001' 621 denotes an electronic document to be subjected to the execution of the document type sorting operation, and whether its item 'electronic document type' is "obsure" or not is a key for judging the necessity of the sorting operation.

Item 'possessor' means the name of a current user possessing of the electronic document object, and its item value 'user C' means that the current electronic document object is possessed by the user C. The electronic documents 'order form 0704' 622 and 'obscure name 0001' 621 are both possessed by the current user C. Regardless of the fact that an electronic document is clear or unclear in its document type, the name of the user then possessing the document corresponds to the value of the item 'possessor'.

FIG. 8 shows details of the user object 'user C' 613 as an example of the user object.

Item 'user' represents the name of a user for the user object, and item value 'user C' means that the user object 'user C' 613 is for the user C.

Item 'possessed electronic document object list' represents the names of electronic document objects currently possessed by the user C of the user object 'user C' 613. In the example of FIG. 8, the user C possesses two of the electronic documents 'order form 0704' 622 and 'obscure name 0001' 621.

FIG. 9 shows details of the shipping requests stack object 641.

Item 'waiting electronic document object' represents the name of an electronic document object sent from a user terminal into the forwarding requests stack object 641. Item value 'none' means that any electronic document object name is not written for the corresponding request number.

Item 'request number' is the request order of the waiting electronic document object. The forwarding requests stack is a first-in first-out, finite stack and the request number is used for controlling the first-in first-out operation, which will be explained later.

In the case of the shipping requests stack object shown in FIG. 9, the electronic document objects 'multimedia-associated 1183' and 'obscure name 0003' are waiting electronic document objects.

FIG. 10 shows details of the business definition table 650.

Item 'document type' represents the types of electronic documents corresponding to sorting categories when the documents are classified according to their types in the sorting operation of the document type.

Item 'post in-charge' represents the name of the post in-charge corresponding to the document type.

A plurality of post in-charges may be considered in some cases.

In the case of the business definition table 650, the post in-charge of the document, e.g., having the document type 'order form' is an accountants' department and thus the forwarding executing program ships the electronic document as the order form to the server of the accountants' department or to the workflow manager of the department. In the business definition table, a document corresponding to 'obscure' in the document type means such a document that is judged as 'unsortable' as a result of the sorting operation, and the forwarding executing program ships the document having the unspecific next workflow entrance location to the manager Z.

(3-3) Procedure Program Block

Figure 11:
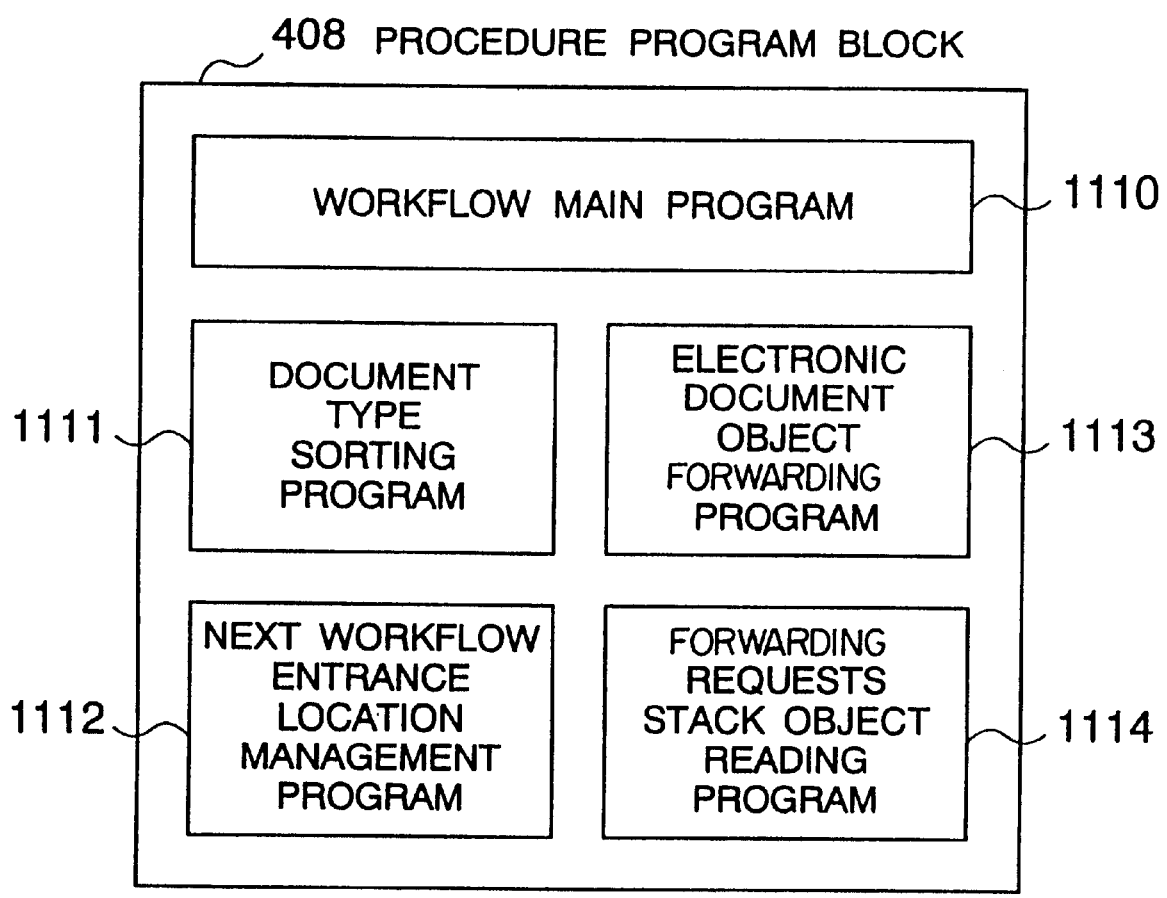
FIG. 11 shows a structure of a procedure program block.

As shown in FIG. 11, the procedure program block 408 includes a workflow processing main program 1110 in which main processing procedures in the workflow operation are described, a stack object reading program 1114 in which a reading procedure of the forwarding requests stack object 641 in FIG. 6 is described, a document type sorting program 1111 for performing sorting operation over the read electronic document according to the document type, a next workflow entrance location managing program 1112 in which main processing procedures of managing the next workflow entrance location based on the document type are described, and an electronic document object forwarding program in which a procedure of forwarding electronic document from the previous forwarding user to the next forwarding user is described.

The stack object reading program 1114, document type sorting program 1111, next workflow entrance location managing program 1112 and electronic document object forwarding program 1113 form subroutines of the workflow processing main program 1110. In particular, the electronic document object forwarding program 1113 is also a subroutine of the next workflow entrance location managing program 1112.

These programs will be explained later.

(4) Explanation of Data Stored in Memory 506 of User Terminal 304 (FIG. 5)

As shown in FIG. 5, the memory 506 contains the workflow client service program 520, application program block 524, and workflow object work area 522.

(4-1) Workflow client service program

The workflow client service program 520 describes the processing procedures at the user terminals, which will be explained later.

(4-2) Application Program Block

The application program block 524 includes an application program such as a wordprocessor for editing electronic documents.

(4-3) Workflow Object Work Area

The workflow object work area 522 is used to copy the workflow object being stored in the workflow object block 412 of the server 350 to the memory 506 of the terminal through the network 316 in order to confirm, refer to or edit the electronic document of the workflow object circulated as an electronic document with use of the application program.

The editing of the workflow object at the user terminal is carried out over the workflow object copied to the workflow object work area 522. After completion of the editing operation, when the terminal user overwrites the workflow object stored in the workflow object block 412 of the server 350 through the network 316, the workflow object is updated.

(5) Explanation of Electronic Document Workflow Managing Procedure

The workflow managing procedure is described in the procedure programs of the procedure program block 408 of the server 350 and in the workflow client service programs of the respective user terminals.

(5-1) Server Electronic Document Workflow Procedure

The server electronic document workflow procedure, which forwards an electronic document from one user to another, is stored in the programs of the procedure program block 408.

As already explained in FIG. 11, the procedure program block 408 includes the workflow processing main program 1110 in which main processing procedures in the workflow operation are described, the stack object reading program 1114 in which a reading procedure of the forwarding requests stack object 641 in FIG. 6 is described, the document type sorting program 1111 for performing sorting operation over the read electronic document according to the document type, the next workflow entrance location managing program 1112 in which main processing procedures of managing the next workflow entrance location based on the document type are described, and the electronic document object shipping program 1113 in which a procedure of forwarding electronic document from the previous forwarding user to the next forwarding user is described.

Figure 12:
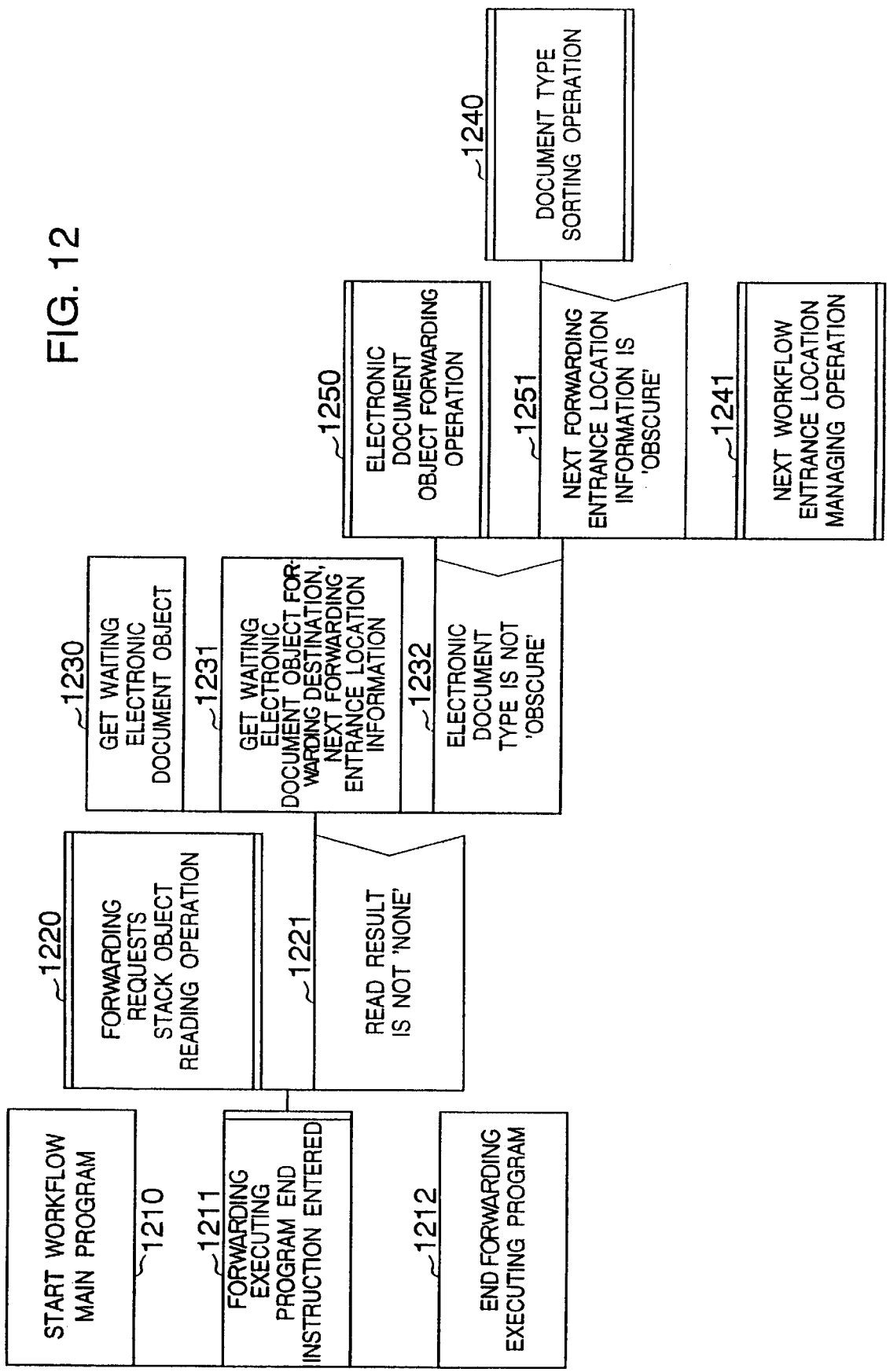
FIG. 12 is a PAD diagram for explaining the operation of a workflow processing main program.

Described in the workflow processing main program 1110 is such a procedure as shown by a PAD diagram in FIG. 12.

More in detail, the workflow main program starts its processing at a step 1210 and proceeds to a step 1211.

At a step 1211, the processings of the step 1220 and subsequent steps are repetitively executed until a user enters an end instruction from its terminal. The entrance of the end instruction from the user terminal causes the program to go to a forwarding executing program end step 1212.

At the step 1212, the forwarding executing program terminates its processing operation.

Figure 13:
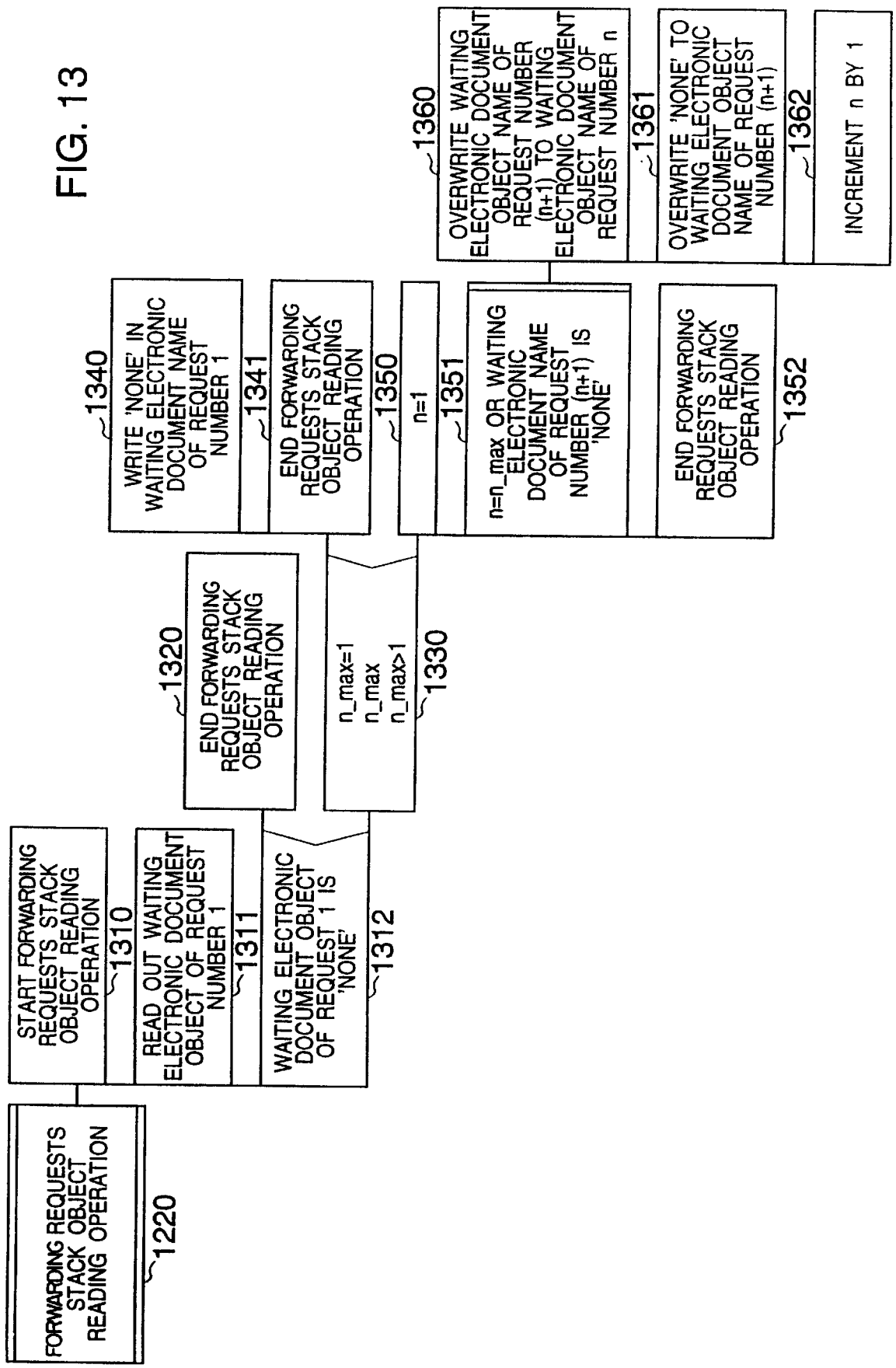
FIG. 13 is a PAD diagram for explaining the operation of a forwarding request stack object reading program.

At a step 1220, the program executes the reading operation of the forwarding requests stack object 641 and proceeds to a step 1221. The reading procedure of the forwarding requests stack object is shown in FIG. 13 by a PAD diagram.

At a step 1310, the program starts its reading operation over the forwarding requests stack object and proceeds to a step 1311.

At the step 1311, the program reads out the waiting electronic document object of the request number 1 as a read result and goes to a step 1312.

At the step 1312, when the read result of the waiting electronic document object of the request number 1 is 'none', the program executes the processing of a step 1320. Otherwise, the program performs the processings of a step 1330 and subsequent steps.

At the step 1320, the programs determines that the read result is 'none' and completes the reading operation of the forwarding requests stack object.

The forwarding requests stack object is a first-in first-out stack. In the operations of the steps 1330 to 1362, the program clears the stack of the request number 1 to move up the contents of the stack.

At the step 1330, the program judges whether a maximum stack number 'n_max' of the forwarding requests stack object is equal to 1 or larger than 2 (n_max≧1). In the case of 'n_max=1', the program perform the operations of the step 1340 and subsequent steps. In the case of 'n_max>1', the program performs the operations of the step 1350 and subsequent steps.

At the step 1340, the program writes 'none' in the item 'waiting electronic document object' of the request number 1 and goes to a step 1341.

At the step 1341, the program terminates the reading operation of the forwardinq requests stack object.

At a step 1350, the program sets 1 at the initial value of a counter variable n of the request number and proceeds to a step 1351.

At the step 1351, the program executes the operations of a step 1360 and subsequent steps until a relationship 'n=n_max' is satisfied or a waiting electronic document object name of a request number 'n+1' becomes 'none'. When the relationship 'n=n_max' is satisfied or the waiting electronic document object name of the request number (n+1) becomes 'none', the program goes to a step 1352.

At the step 1352, the program terminates the reading operation of the forwarding requests stack object.

At the step 1360, the program overwrites the waiting electronic document object name of the request number (n+1) to the waiting electronic document object name of a request number n and goes to a step 1361.

At the step 1361, the program overwrites 'none' to the waiting electronic document object name of the request number (n+1) and goes to a step 1362.

At the step 1362, the program increments n by one and proceeds to the step 1351.

Through the above procedure, the reading operation of the forwarding requests stack object 641 is carried out.

In the case of such a forwarding requests stack object as shown in FIG. 9, the above reading operation of the forwarding requests stack object causes the electronic document object 'multimedia-related 1183' of the request number 1 to be read out. When the reading operation of the forwarding requests stack object is completed, the electronic document object name 'multimedia-related 1183' is obtained as a result of the reading operation of the step 1220.

With regard to the forwarding requests stack object 641 after the reading operation, 'obscure name 0003' is written in the item 'waiting electronic document object' for the request number 1, while 'none' is written in the item 'waiting electronic document object' for the request number 2.

At the step 1221, when the read result of the forwarding requests stack object is not 'none', the program carries out the operations of a step 1230 and subsequent steps. Otherwise, the program terminates the operation of the step 1221 and goes to the step 1211.

At the step 1230, the program gets a forwarding wait electronic document object from the electronic document object name read out in the step 1220 and goes to a step 1231. In the case of such a forwarding requests stack object as shown in FIG. 9, since the electronic document object name is 'multimedia-related 1183', the program gets the electronic document object 'multimedia-related 1183' and proceeds to the step 1231.

At the step 1231, the program gets the previous shipping user and next forwarding entrance location information of the associated electronic document from the electronic document object obtained in the step 1230, and goes to a step 1232. The previous forwarding user is the user who issued a forwarding request to the electronic document object in question and also whose name is written in the item 'possessor' of the electronic document object. The next forwarding entrance location information is obtained from the workflow sequence description defined by the user or from the in-charge candidate object prepared as a result of the sorting operation to be explained later. When failing to get the next forwarding entrance location information, the program sets the next forwarding entrance location information at 'obscure'.

At the step 1232, the program goes to a. step 1250 when the electronic document type in the electronic document object is determined, whereas, the program goes to a step 1251 and subsequent steps to perform the operations thereof when the electronic document type in the electronic document object is 'obscure'.

At the step 1250, the program performs its forwarding operation to forward the electronic document object to the next workflow entrance location.

At the step 1251 and subsequent steps, the program examines the next forwarding entrance location information first at the step 1251 and, only when the next forwarding entrance location information obtained in the step 1231 is 'obscure', performs the operation of a step 1240. After the operation of the step 1251, the program executes the operation of a step 1241.

Figure 14:
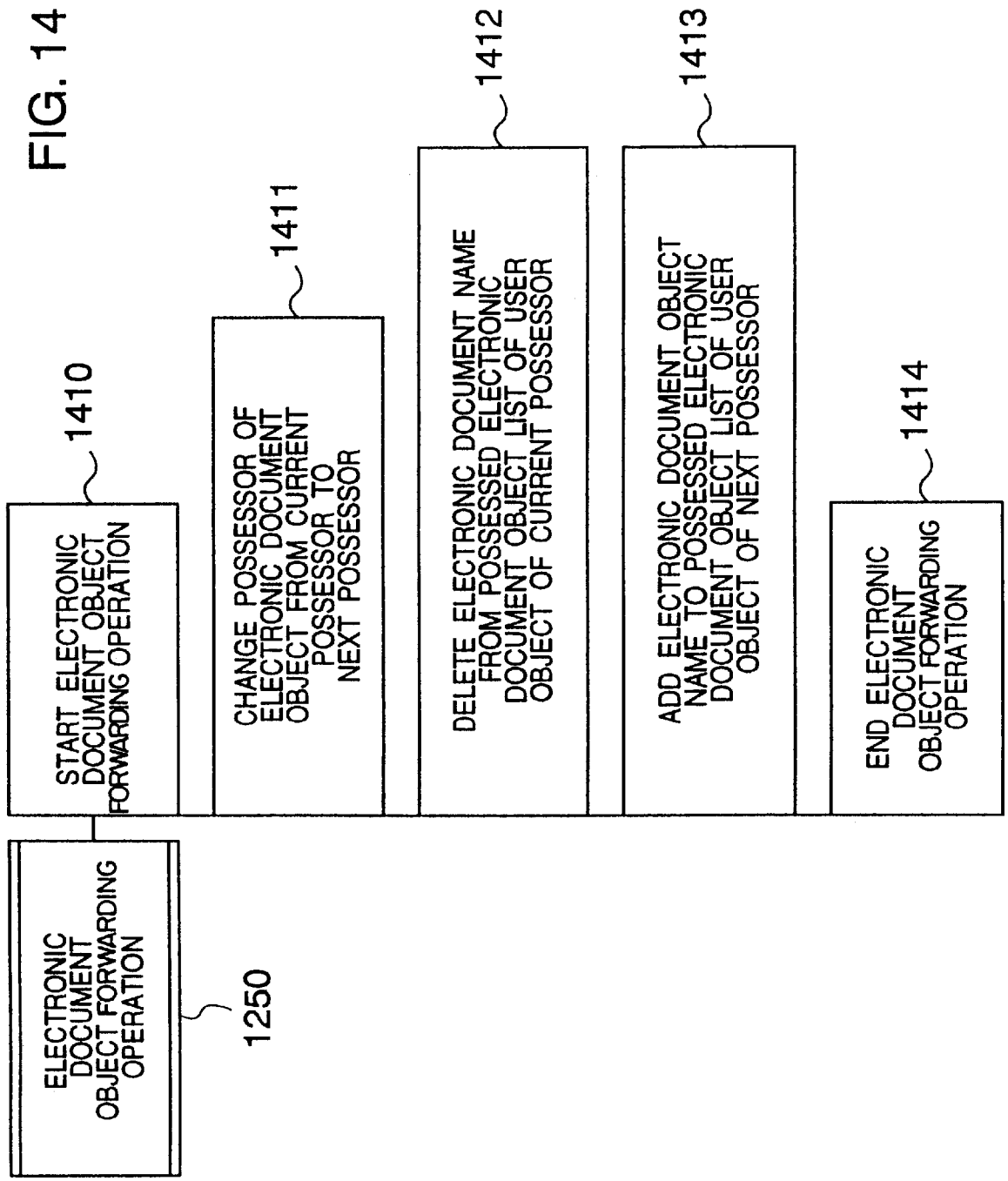
FIG. 14 is a PAD diagram for explaining the operation of an electronic document object forwarding program.

The forwarding procedure of the electronic document object in the step 1250 is shown in FIG. 14 by a PAD diagram.

More in detail, at a step 1410, the program starts its electronic document object forwarding operation and proceeds to a step 1411.

At the step 1411, the program changes the possessor of the electronic document to be forwarded from the current possessor to the next possessor and goes to a step 1412.

At the step 1412, the program deletes the electronic document object name from the electronic document object list belonging to the user object of the current possessor, and proceeds to a step 1413.

At the step 1413, the program adds the electronic document object name to the electronic document object list belonging to the user object of the next possessor, and goes to a step 1414.

At the step 1414, the program terminates its electronic document object forwarding operation.

Through the above processing procedure, the electronic document object forwarding operation is carried out.

The electronic document object 'multimedia-related 1183' obtained at the step 1230 is forwarded to the first unit 122 according to the business definition table 650 since its document type is 'multimedia-related'.

If the electronic document object attained at the step 1230 has a name 'obscure name 0003', then the program performs the operations of the step 1240 and subsequent steps, because its document type is 'obscure' and the next forwarding entrance location information is 'obscure'.

Figure 15:
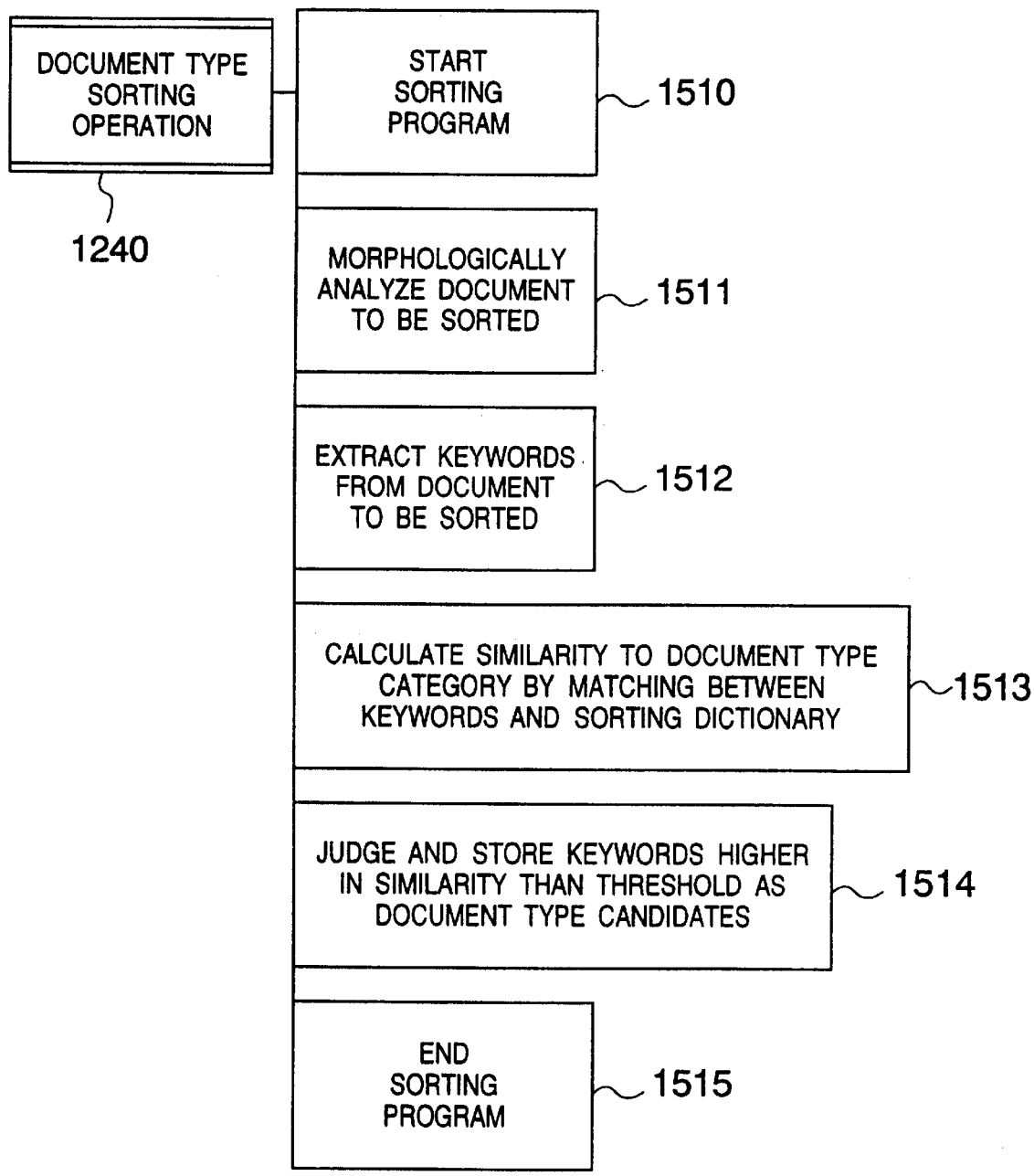
FIG. 15 is a PAD diagram for explaining the operation of a document type sorting program.

Next, the program performs the document type sorting operation of the step 1240. The operation of the step 1240 is shown in FIG. 15 by a PAD diagram. Further shown in FIG. 16 is how the document is actually sorted when the operation of the step 1240 is carried out.

Figure 16:
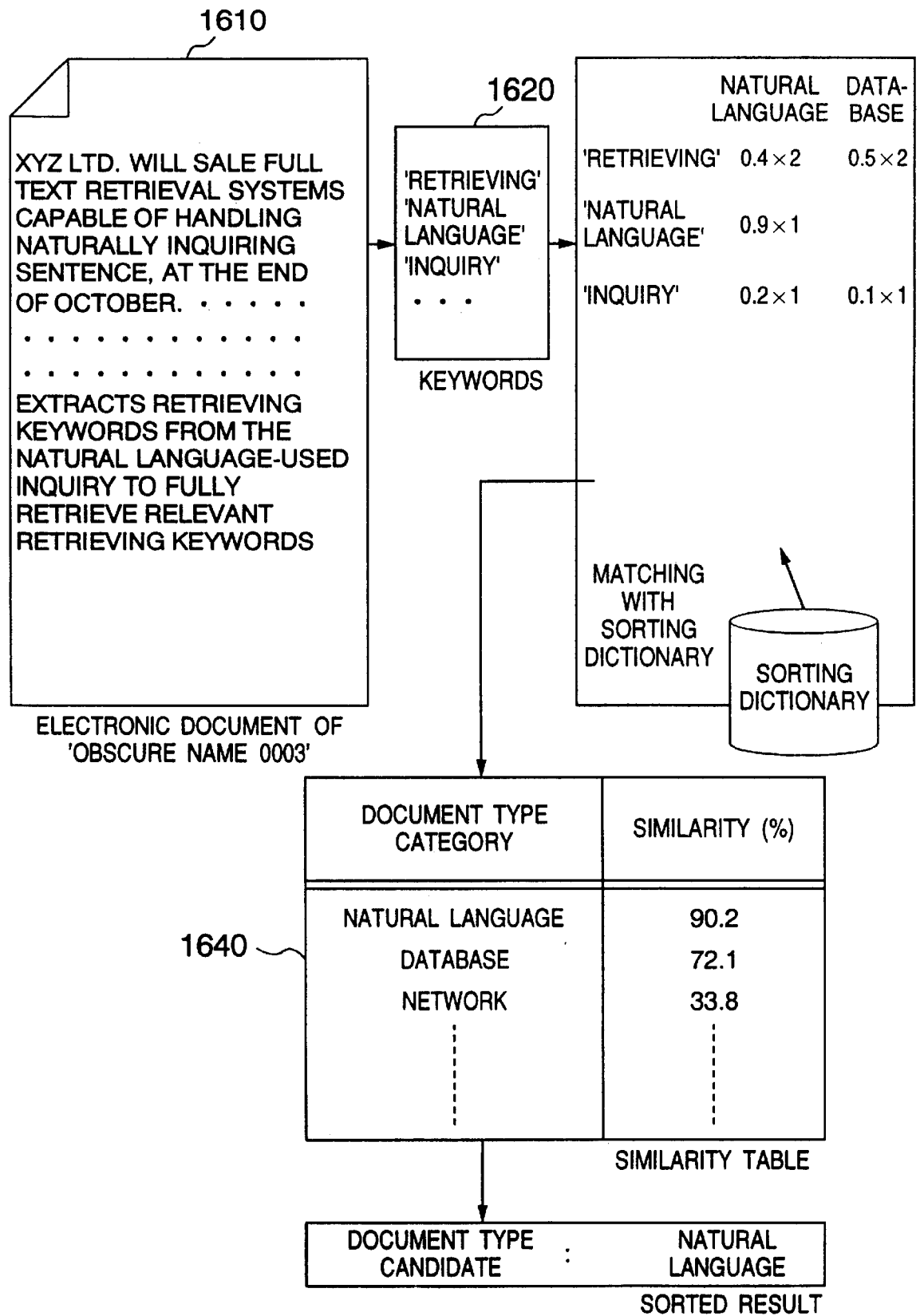
FIG. 16 shows the concept of document type sorting operation.

Explanation will then be made as to the document type sorting operation in connection with FIGS. 15 and 16.

At a step 1510, the program starts its document type sorting operation and goes to a step 1511. In the case of FIG. 16, the electronic document object to be sorted is the object 1610 of 'obscure name 0003'.

At the step 1511, the program morphologically analyzes the electronic document to be sorted and goes to a step 1512. The morphological analysis means such processing that a sentence is divided into words to obtain attribute information on the respective words such as part-of-speech information.

At the step 1512, the program extracts a keyword or keywords from the electronic document after the morphological analysis obtained at the step 1511, and goes to a step 1513. A group of keywords 1620 includes keywords obtained from the electronic document object of 'obscure name 0003'. An example of the keyword extraction method is to extract, e.g., only nouns and verbs from the words obtained through the morphological analysis, eliminates, as unnecessary words, from the words such words as to frequently appear even in other sorting categories because these words do not feature the specific category, and employ the remaining words as keywords.

At the step 1513, the program provides matching between words in a pre-prepared sorting dictionary and the keywords extracted at the step 1512 to calculate a similarity to the sorting category of the electronic document in question, and then goes to a step 1514. In the illustrated example, the program calculates the similarity high to which sorting category taking the keyword appearance frequency and weight into consideration.

An example of the method for determining weights to the keywords is shown in a paper "Automatic Sorting of Documents Using Weighting IDF" of Research Report of the Information Processing Society of Japan, written by Takanobu Tokunaga et al., 94-NL-100-5, pp. 33–39, May 17, 1994.

Among the keywords in the group 1620, 'retrieving' appears twice while 'natural language', and 'inquiry' appear each once. In the matching operation example of FIG. 16 with the sorting dictionary, in the natural language word category, the keyword 'retrieving' has a weight of 0.4, the keyword 'natural language' has a weight of 0.9, and the keyword 'inquiry' has a weight of 0.2. In the database category, on the other hand, the keyword 'retrieving' has a weight of 0.5, the keyword 'natural language', has a weight of 0.0, and the keyword 'inquiry' has a weight of 0.1. Even in other document type categories, the keywords have weights corresponding to the respective categories.

The program adds multiplications of weights and appearance frequencies, normalizes it, and calculate a similarity for each category. Results of the similarities calculated through the matching operation are shown in a similarity table 1640.

At the step 1514, the program extracts and stores a document type candidate from the calculation result of the step 1513, and then goes to a step 1515. As a result of sorting, 'natural language word' having a similarity beyond a predetermined threshold in the similarity table 1640 is obtained as the document type candidate.

When the program terminates the operation of the step 1251, the program proceeds to the step 1241.

At the step 1241, the program manages the next workflow entrance location with use,of the document type candidate obtained at the step 1240. The operation of the step 1241 is shown in FIG. 17 by a PAD diagram.

Explanation will then made as to the next workflow entrance location managing operation in connection with FIG. 17.

At a step 1710, the program starts its next workflow entrance location managing operation and goes to a step 1711.

At the step 1711, the program examines the presence or absence of the in-charge candidate object in the workflow management block. The absence of the in-charge candidate object causes the program to proceed to the operations of a step 1740 and subsequent steps. In the. operations of a step 1740, the program prepares the in-charge candidate object.

At the step 1740, the program obtain the name of the document type candidate stored at the step 1240 and goes to a step 1741.

At the step 1741, the program examines the number of the document type candidates obtained at the step 1740. When the document type candidate number is plural, the program carries out the operations of steps 1750 to 1753, while, when the candidate number is one, the program goes to a step 1754. When any document type candidate is not present, that is, when the sorting is impossible, the program performs no operation at the step 1741.

When completing the operation of the step 1741, the program goes to a step 1742.

When the document type candidate number is plural at the step 1741, the program, at the step 1750, refers to the business definition table showing a relationship between the predetermined document type categories and in-charge candidates associated therewith, and prepares an in-charge candidate object in the candidate list of the use in charge of the document. More specifically, at the step 1750, the program gets user objects for the in-charge candidates, examines the number of the electronic document object lists possessed by each user, and then goes to the step 1751.

At the step 1751, the program judges whether or not the in-charge candidates are the same condition in the number of the electronic document objects possessed by each candidate. When the number is the same, the program goes to the step 1752 to perform the operation thereof; whereas, otherwise, the program goes to the step 1753 to perform the operation thereof.

At the step 1752, with respect to the in-charge candidates having the same number of electronic document objects, the program writes the electronic document types and in-charge candidate names in the in-charge candidate objects with the same item number.

At the step 1753, the program sequentially writes the electronic document types and in-charge candidate names, starting with a user having a less number of the possessed electronic document objects.

Through the above operations, the branching operation from the step 1741 is completed.

At the step 1742, the program writes the document type 'obscure' and in-charge candidate name 'manager Z' in the line of the next item number of the in-charge candidate object and terminates its preparing operation of the in-charge candidate object.

The program stores the prepared in-charge candidate object in the in-charge candidate object block 630 and then goes to a step 1712.

The preparation of the in-charge candidate object forms an important part of means for performing workflow managing operation over such documents as to have their next workflow entrance locations not specified, which is one of major features of the present invention. Explanation will be made as to 3 patterns of in-charge candidate objects prepared according to the sorted result by referring to FIG. 18A to 18C.

FIG. 18A is an example of contents of the in-charge candidate object prepared through the operations of the step 1740 and subsequent steps when only one document type candidate is obtained through the sorting operation and correspondingly the in-charge candidate of the document is obtained.

When only one result is obtained as a result of the sorting operation, the correction percentage of the sorted result becomes high, but it is considered impossible to provide 100% of correction and thus the workflow management when the sorted result is wrong becomes necessary.

As will be explained later, a means is provided for committing the judgement of the wrong or correct sorted result to the next workflow user in the present invention, so that when the next workflow user receives electronic documents and a document not in charge of the next workflow user gets mixed into the received documents, the user can send it back.

Since the next workflow entrance location management program within the server receiving a notification of the send-back operation of the next workflow user cannot specify the next workflow entrance location under this condition, this requires such a means as to manage the workflow of the document having an obscure next workflow entrance location. In the illustrated example, the next workflow entrance location management program can specify the next workflow entrance location with use of the business process definition described by the workflow manager Z.

FIG. 18A means that the document type candidate of the electronic document subjected to the sorting operation is judged as an order form, in which case the document is to be in charge of the accountants' department and thus the document is sent to the accountants' department. The document type item has 'obscure' for item number 2, which means that the next workflow entrance location cannot be specified. In the illustrated example, the document is sent to the 'manager Z' in the in-charge item. The forwarding executing program reads the item number 2 and performs the workflow operation to the manager Z, when the electronic document to be workflow-managed was not an accounts settlement form and was sent back from a general affairs department.

FIG. 18B is an example of contents of the in-charge candidate object when such a keyword as to be able to determine the type of the electronic document cannot be extracted from the electronic document and it is impossible to sort the document as a result of the sorting operation. In the illustrated example, the electronic document is sent to the 'manager Z' in the in-charge user item.

FIG. 18C is an example of contents of the in-charge candidate object when a plurality of types of document candidates are obtained as a result of the sorting operation.

When a plurality of sorted results are obtained, the next workflow entrance location management program examines the user object of the in-charge user on the basis of the in-charge user names of the document type candidates, and judges a load condition on the user work from the conditions of the possessed electronic document object list to cause the users to look at the document sequentially from the user having a lighter load condition. When judging to find substantially no difference in the user load between the users, the program acts to broadcast the plural documents to the users.

FIG. 18C is an example of contents of the in-charge candidate object to the electronic documents obtained as the document type candidates of two types 'database-associated' and 'natural language word-associated'. In this case, the in-charge candidates are 'fourth unit' and 'fifth unit' and workflow is carried out from one of the candidates having the smaller-numbered item number of the in-charge candidate object. When receiving the send-back operations from all the next workflow entrance locations determined through the sorting operation, that is, when failing to specify the next workflow entrance locations, the program sends the documents to the manager Z.

When eventually failing to specify the next workflow entrance location in all the above three patterns, the program ships the document having the obscure next workflow entrance location to the workflow manager Z within the unit. In this case, the manager Z looks at the contents of the received document, specifies its next workflow entrance location/workflow path, and issues a forwarding request for the document. The forwarding executing program performs the subsequent workflow operations according to the input from the user Z.

Through the above operations, the explanation of the in-charge candidate object prepared through the step 1740 and subsequent steps has been finished.

Through the above operations, the program terminates the operation of the step 1711 and proceeds to the step 1712.

At the step 1712, the program extracts the next forwarding entrance location information of the first in-charge candidate from the in-charge candidate object of the workflow document stored in the in-charge candidate object block 630 and goes to a step 1713.

At the step 1713, the program performs the forwarding operation of the electronic document object and goes to a step 1714. In this connection, the forwarding operation of the electronic document object is the same as the forward operation of the electronic document object at the step 1250 including the operations of the steps 1410 to 1414.

At the step 1714, the program examines the presence or absence of an input signal from the user terminal. The presence of the input signal causes the program to go to a step 1720 and subsequent steps for perform the operations thereof. Otherwise, the program goes to a step 1715.

At the step 1720, the program gets the name of the user who issued the input signal as well as the name of the electronic document object subjected at the terminal unit side to the input operation, and proceeds to a step 1721.

At the step 1721, the program gets the in-charge candidate object of the electronic document object in question and goes to a step 1722.

At the step 1722, the program examines the type of the input signal in such a manner that the program goes to a step 1731 when the input signal is a document acquisition signal; whereas, the program goes to steps 1732 and 1733 when the input signal is a document send-back signal.

At the step 1731, the program deletes the in-charge candidate object of the associated electronic document object. The above operations cause the program to determine the document type of the electronic document object and the next workflow entrance location thereof. The document acquisition signal from the user terminal means the determination of the document type.

At the step 1733, the program ships the electronic document object to the shipping requests stack. The document send-back signal from the user terminal means that the document type is not the document type of the document in charge of the user, and thus the next workflow entrance location managing program 1112 forwards the electronic document in question to the forwarding requests stack for workflow to the next in-charge candidate.

After the above operations, the programs terminates its next workflow entrance location managing operation at the step 1715.

(5-2) Workflow Management at Processing Terminals

The workflow managing procedures of the processing terminals are described in the workflow client service program 520.

Figure 19:
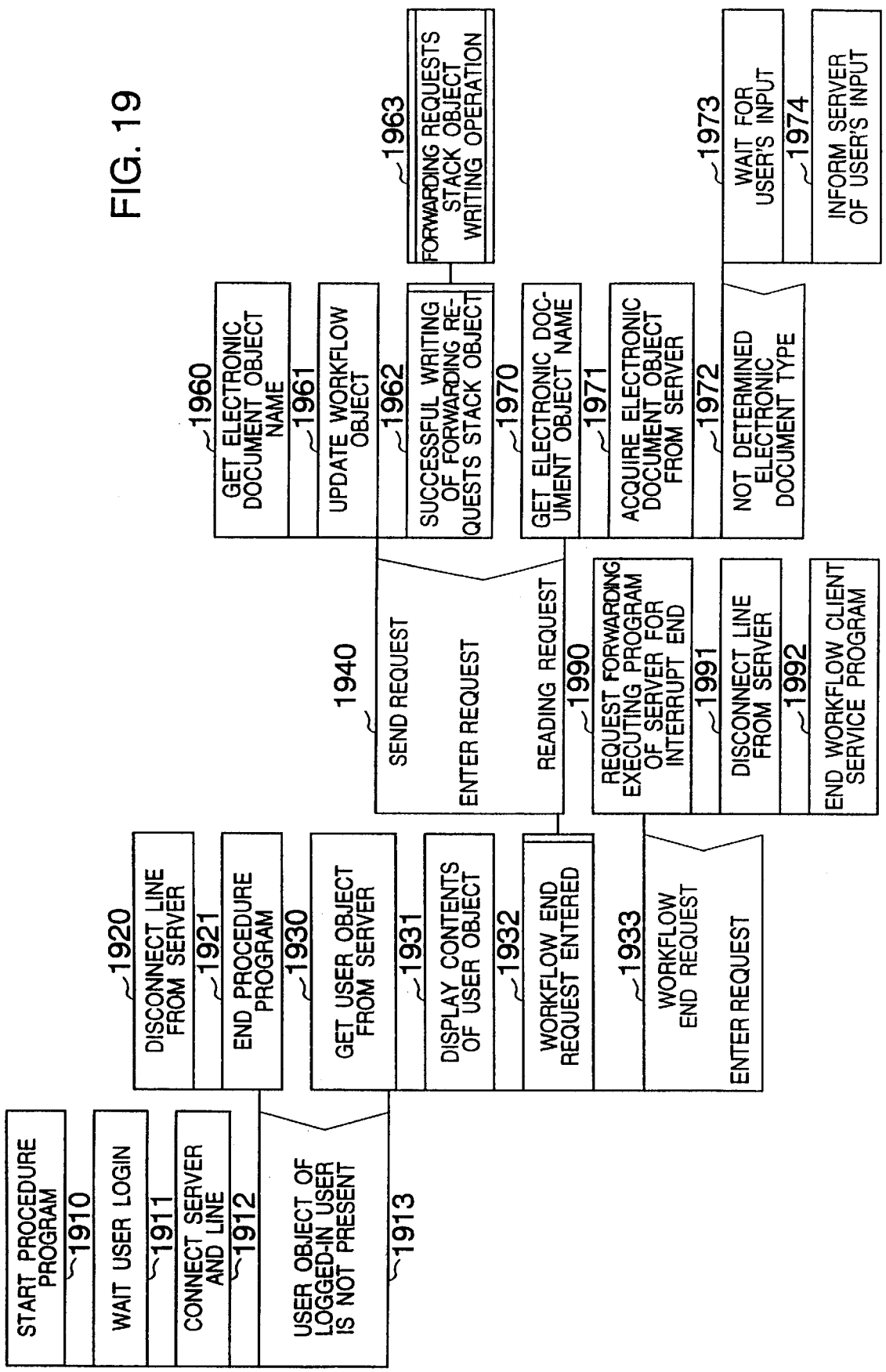
FIG. 19 is a PAD diagram for explaining the operation of a workflow client service program.

The workflow client service program 520 describes such a procedure as shown in FIG. 19 by a PAD diagram.

That is, at a step 1910, the workflow client service program starts and goes to a step 1911.

At the step 1911, the program waits for login of the user to the user terminal, i.e., for successful input of the user name and password from the keyboard, and when the login ended successfully, the program goes to a step 1912.

At the step 1912, the programs connects the user terminal 304 and server 350 through the terminal network connector 502 of the user terminal 304, the network 316 and the network connector 406 of the server 350; and then goes to a step 1913.

At the step 1913, the program judges the presence or absence of the user object with respect to the terminal lonin user in the server 350. In the absence of the user object, since the user cannot use the workflow managing system, the program goes to a step 1920. In the presence of the user object, the program proceeds to a step 1930. Since the user authorized to use the present workflow managing system has its user object within the user object block 610, the program executes the operations of the steps 1930 and subsequent steps.

At the step 1920, the server is disconnected from the user terminal, that is, the program disconnects the line connected at the step 1912 from the server and then goes to a step 1921.

At the step 1921, the workflow client service program ends.

At the step 1930, the program gets the contents of the user object through the network 316 and proceeds to a step 1931.

At the step 1931, the program displays the contents of the user object obtained at the step 1930 and a processing menu for the user on the display screen of the display unit 514, and then proceeds to a step 1932.

Figure 20:
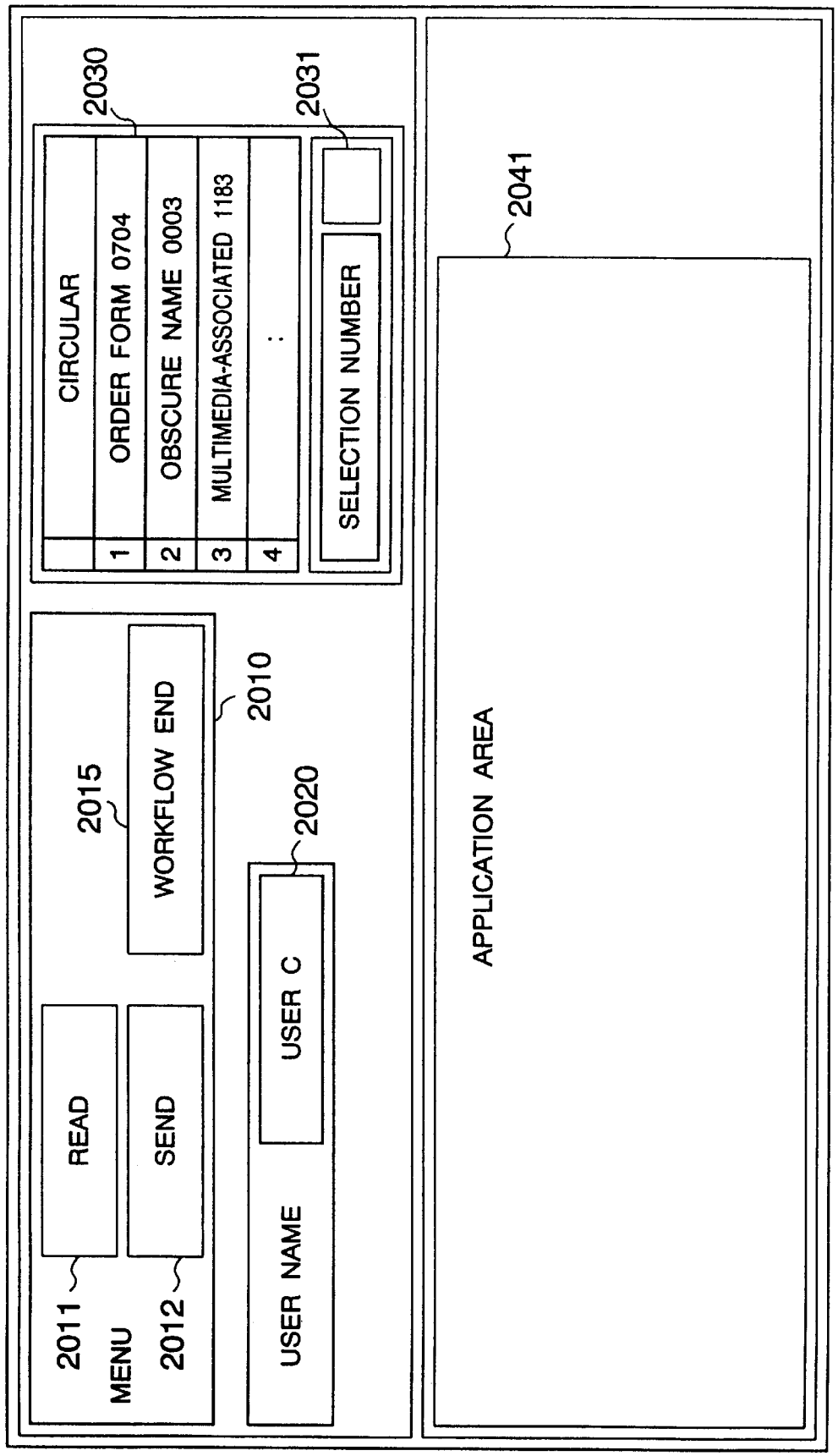
FIG. 20 is an example of display appearing on a display unit 514 of a user terminal.

Shown in FIG. 20 is an example of the display screen when the in-charge candidate of the workflow document is already determined, that is, when the document type at the step 1232 is not 'obscure' and the program goes to the step 1250.

More in detail, in FIG. 20, a menu for the processing at the user terminal is displayed on a display zone 2010. When the user clicks the mouse 512 on buttons 2011 or 2015, an execution instruction indicative of a function allocated to the clicked button is sent to the operating unit 504 through the user interface 508.

The reading button 2011 has a function of reading the electronic document circulated, the sending button 2012 has function of sending the electronic document, a system end button 2015 has a function of terminating the server 350 and user terminal 304.

Displayed on a display zone 2020 is the name of the user now using the current user terminal.

Displayed on a display zone 2030 is the name of the electronic document object in the electronic document object list of the user object as the electronic document possessed by the user. A display zone 2031 is used, for the purpose of specifying the electronic document object to be processed at the terminal, for the user to enter the number displayed together with the name of the electronic document object through the keyboard 510.

A display zone 2041 is an application zone where the electronic document object is referred, confirmed. and the associated electronic document is edited, on which the electronic document specified by the user on the display zone 2031 is displayed.

Figure 21:
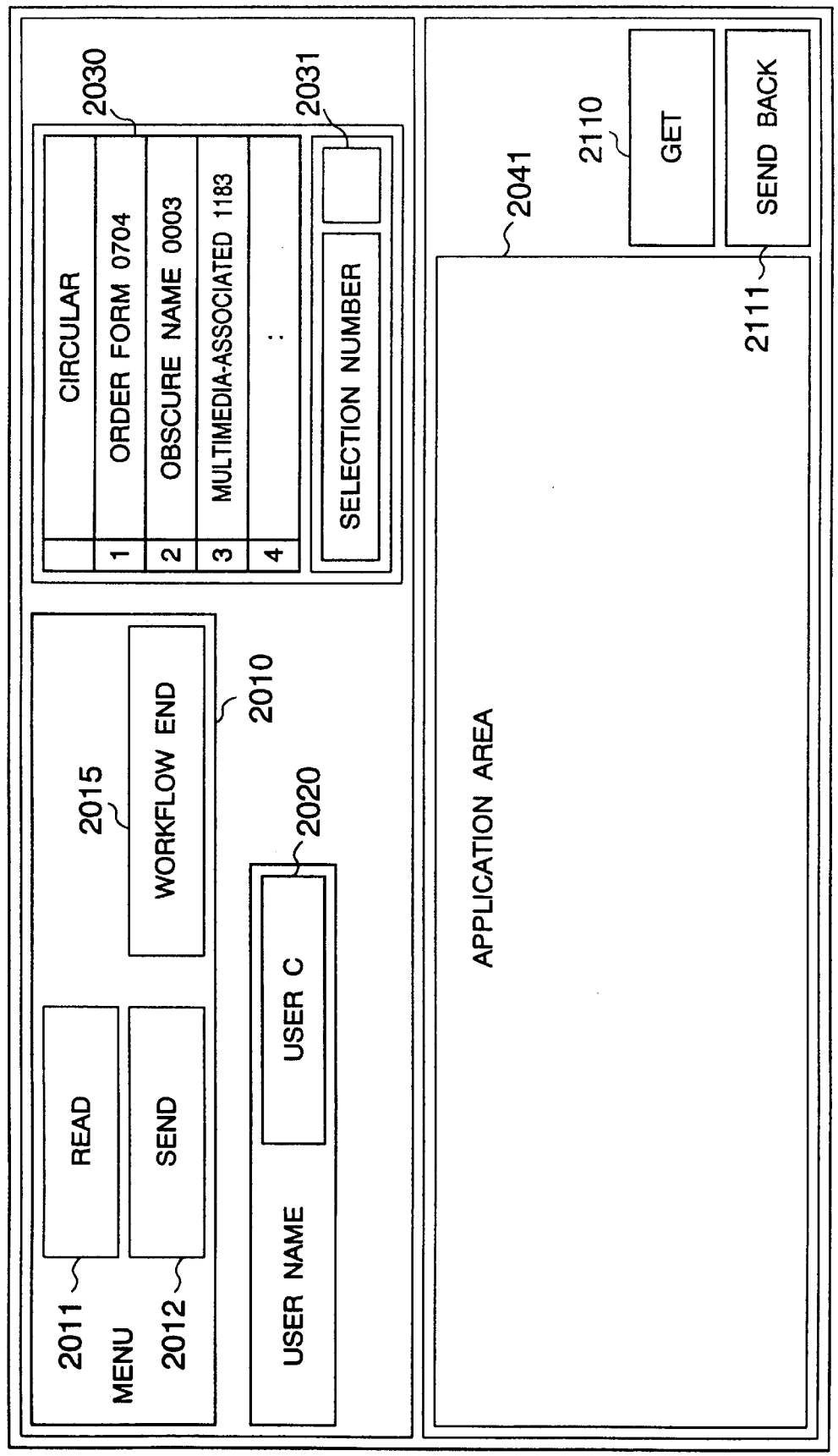
FIG. 21 is another example of display appearing on the display unit 514 of the user terminal.

FIG. 21 is an example of the display screen when the in-charge user of the workflow document is not determined, that is, when the document type information is 'obscure' at the step 1232 and the program goes to the step 1240 and subsequent steps.

In FIG. 21, the buttons 2010 to 2041 are the same as those having the same numerals in FIG. 20. When the user clicks the mouse 512 on a button 2110 or 2111, the execution instruction of a function allocated to the clicked button is given to the operating unit 504 through the user interface 508.

Allocated to the buttons 2110 and 2111 are a document acquisition function and a document remand function, respectively. When the button 2110 is depressed, the fact that the user now logging in to the server from the user terminal is in charge of the electronic document in question, is transmitted to the server through the network, the so-far-'obscure' document type of the electronic document in the workflow is determined and written in the electronic document type of the electronic document object, and correspondingly the in-charge user is also determined by referring to the business definition table 650.

At the step 1932, the programs waits for a request input based on user's depression of the button, and when the user depresses the workflow end button 2015, the program goes to a step 1933. When the user depresses another button other than the button 2015, the program goes to a step 1940.

At the step 1933, when the user depresses the workflow end button at the step 1932 to enter a workflow end request, the program goes to a step 1990.

At the step 1990, the input of the end instruction of the forwarding executing program causes the program to go to a step 1991 during the execution of the step 1211 by the workflow processing main program 1110 of the server 350.

At the step 1991, the program disconnects the line connected to the server 350 at the step 1912 from the server, and then proceeds to a step 1992.

At the step 1992, the workflow client service program ends.

At the step 1940, the depression of the button at the step 1932 causes the program to perform its branching operation.

A depression of the reading button 2011 causes the program to perform its electronic document reading operation through steps 1970 and 1971 and then to go to the step 1970.

The electronic document reading operation means, for the purpose of editing the electronic document with use of the application program in the application program block 524, to copy the workflow object as the contents of the electronic document forwarded to the user to the workflow object work area 522 of the user terminal from the server 350 to the network 316.

A depression of the sending button 2012 causes the program to proceed to a step 1960 to perform the electronic document sending operations of steps 1960 to 1963.

The electronic document sending operation means, for the purpose of forwarding the electronic document to the next workflow entrance location through the electronic document workflow procedure of the server 350, to write the name of the electronic document required to be forwarded into the forwarding requests stack object 641 of the server 350.

(5-2-1) Electronic Document Reading Operation

At the step 1970, the program first gets a selection number entered by the user from the input zone 2031. The program then acquires the name of the electronic document object corresponding to the selection number from the list of the electronic document object names displayed on the display zone 2030, and goes to the step 1971.

When the user enters into the input zone 2031 a selection number corresponding to the electronic document to be read by referring to the display zone 2030, the program can get at the present step the name of the electronic document object required by the user to be read. When the user C enters '1' into the display zone 2031, 'order form 0704' is obtained as the name of the electronic document object to be read.

At the step 1971, the program gets the electronic document object from the electronic document object name obtained at the step 1970, copies the workflow object of the workflow object list corresponding to the electronic document object in question to the workflow object work area 522 from the server 350 through the network 316, and then goes to a step 1972.

At the step 1972, when the document type of the workflow object of the electronic document object in question is 'obscure', the program goes to a step 1973.

At the step 1973, the program waits for user's input from the zone 2110 or 2111 with respect to the workflow object copied to the workflow object work area, and when receiving the user's input, the program proceeds to a step 1974. At the step 1974, the program informs the server of the input signal obtained at the step 1973.

After completion of the terminal processing, the user can edit the workflow object copied to the workflow object work area 522 with use of the application program of the application program block 524.

(5-2-2) Electronic Document Sending Operation

At the step 1960, the program gets a selection number entered by the user on the input zone 2031. Then the program gets an electronic document object name corresponding to the selection number from the list of the electronic document object names displayed on the display zone 2030, and proceeds to a step 1961.

When the user enters on the input zone 2031 the selection number corresponding to the electronic document to be sent, the program can get the name of the electronic document object required by the user to be sent at the present step. An entry of '1' into the input zone 2031 by the user C causes the program to get 'order form 0704' of the document object 622 as the electronic document object name to be sent.

At the step 1961, the program gets the electronic document object from the electronic document object name obtained at the step 1960 and also gets the name of the electronic document object in question. Then the program overwrites the workflow object of the electronic document in question to the workflow object stored in the workflow object block of the server 350 from the workflow object work area 522 through the network 316, and goes to a step 1962.

When the electronic document object name obtained at the step 1960 is 'order form 0704' of the document object 622, the program overwrites 'order0704.txt' and 'order0704.bmp' from the workflow object work area 522 to 'order0704.txt' and 'order0704.bmp' in the workflow object block of the server 350 respectively. Accordingly, the user when receiving the electronic document object 622 of the 'order form 0704' can accept the electronic document object 622 of the 'order form 0704' edited by the user C.

At the step 1962, the program judges whether or not the forwarding requests stack object writing operation of a step 1963 was successfully carried out, and the program performs the operation of the step 1963 until the forwarding requests stack object writing operation is successfully carried out. When completing the forwarding requests stack object writing operation successfully, the program proceeds to the step 1932.

The forwarding requests stack object writing operation is shown in FIG. 22 by a PAD diagram. In the drawing, 'n_max' denotes a maximum stack number of the forwarding requests stack object.

More in detail, at a step 2210, the program starts the forwarding requests stack object writing operation and goes to a step 2211.

At the step 2211, program sets '1' at the initial value n as a request number count variable, and then proceeds to a step 2212.

At the step 2212, in order to examine a request number for writing of the waiting electronic document object name, the program performs a step 2220 and subsequent steps until the waiting electronic document of the request number n of the forwarding requests stack object 641 becomes 'none'. When the waiting electronic document of the request number n of the forwarding requests stack object 641 becomes 'none', the program goes to a step 2213. At the step 2213, the program writes the send-requested electronic document object name in the waiting electronic document object of the request number n of the forwarding requests stack object 641, and then proceeds to a step 2214.

At the step 2214, the program completes the shipping requests stack object writing operation.

At the step 2220, when a relationship of 'n<n_max' is satisfied, the program goes to a step 2230, whereas, when the relationship of 'n<n_max' is not satisfied, the program goes to a step 2240.

At the step 2230, the program increments the request number n by '1' and goes to the step 2212.

At the step 2240, since the forwarding requests stack has no space to write the electronic document, the program performs its abnormal terminating operation (a failure in the forwarding requests stack writing operation) over the forwarding requests stack writing operation.

In this way, through the above operations, the program writes the electronic document object name of the electronic document object to be sent in the forwarding requests stack object 641 of the server 350.

When the electronic document object name obtained at the step 1960 is 'order form 0704' of the document object 622 and the forwarding requests stack object writing operation is successfully carried out, the program writes 'order form 0704' of the object 622 as the electronic document object name sent by the user C into the forwarding requests stack object 641.

The electronic document object 622 of 'order form 0704', whose name is written in the forwarding requests stack object 641, is circulated to the next user through the operation based on the workflow processing main program 1110 of the server 350, as mentioned above.

In accordance with the present invention, the users of the present workflow managing system advantageously can eliminate the need for always describing workflow path information in all the electronic documents and thus can lessen the labor to describe workflow paths, which the users have had to write in the prior art.

Further, since the present system automatically prepare workflow management information, the user can lighten his burden imposed on his workflow works and thus can conduct other works during the saved time.

In addition, the automatic management of the workflow paths enables reduction of a time taken after the user enters an electronic document into the present system until the document is forwarded to the next workflow entrance location. This allows lots of documents can be circulated in a short time of period and thus works, which has tended to be behind on the document forwarding, can be efficiently process.

What is claimed is:

1. A workflow server for controlling a forwarding destination of an electronic document externally inputted, comprising:

a network connector which connects to a network a plurality of user units which may become forwarding destinations of said electronic document;

a memory which stores a program for performing a process in said workflow server; and a central processing unit which is connected to said network connector and said memory and operates on a basis of said program stored in said memory to classify said input electronic document in accordance with contents of said input electronic document and to decide a destination, based on results of classifiying, from among said plurality of user units, wherein said workflow server forwards said input electronic document from said network connector to the forwarding destination decided through said network.

2. A workflow server according to claim 1, wherein said central processing unit classifies said electronic document into document types.

3. A workflow server according to claim 2,
wherein said memory further stores a table for correlating document types with groups performing processes corresponding to said document types, and
wherein said central processing unit decides said forwarding destination in accordance with said table.

4. A workflow server according to claim 1,
wherein when the forwarding destination of an input electronic document is not determinable by a pre-defined forwarding destination definition, said central processing unit classifies the input electronic document in accordance with contents of said input electronic document, and determines a forwarding destination associated with the classifying results.

5. A workflow server according to claim 1,
wherein said central processing unit decides a plurality of candidates for the forwarding destinations, and multi-casts said input electronic document to said plurality of forwarding destinations thus decided on.

6. A workflow server according to claim 1,
wherein said central processing unit decides the forwarding destination on the basis of a business process which defines a workflow process of said electronic document.

7. A computer-implemented program for implementing, in an electronic document workflow system having a plurality of workflow groups each having a pre-defined business process, an electronic document workflow method for controlling an electronic document forwarding destination, using a processor, comprising the steps of:
(a) when the forwarding destination of an input electronic document is not determinable by a pre-defined business process, classifying the input electronic document into document types in accordance with contents of said input electronic document;
(b) determining the destination among said plurality of workflow groups of where said input electronic document is to be forwarded on a basis of said document type; and
(c) forwarding said input electronic document to the destination determined in step (b).

8. A computer-implemented program for implementing, in an electronic document workflow system having a plurality of workflow groups each having a pre-defined business process, an electronic document workflow method for controlling an electronic document forwarding destination, using a processor, comprising the steps of:
(a) classifying an input electronic document into document types in accordance with contents of said input electronic document;
(b) deciding, by at least one candidate, the destination among said plurality of workflow groups of where said input electronic document is to be forwarded on a basis of said document type; and
(c) multicasting said input electronic document to candidates of destination thus decided on.

9. A computer-implemented program for implementing, in an electronic document workflow system having a plurality of workflow groups each having a pre-defined business process, an electronic document workflow method for controlling an electronic document forwarding destination, using a processor, comprising the steps of:
(a) classifying an input electronic document into document types in accordance with contents of said input electronic document;
(b) deciding the destination among said plurality of workflow groups of where said input electronic document is to be forwarded on a basis of said document type; and
(c) forwarding said input electronic document to the destination thus decided,
wherein said input electronic document is forwarded according to step (c) on a basis of a business process definition in which a workflow process of said input electronic document in said destination is pre-defined.

* * * * *